(12) United States Patent
Graham

(10) Patent No.: US 7,703,044 B2
(45) Date of Patent: Apr. 20, 2010

(54) TECHNIQUES FOR GENERATING A STATIC REPRESENTATION FOR TIME-BASED MEDIA INFORMATION

(75) Inventor: Jamey Graham, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 1069 days.

(21) Appl. No.: 11/021,303

(22) Filed: Dec. 23, 2004

(65) Prior Publication Data

US 2005/0216838 A1      Sep. 29, 2005

Related U.S. Application Data

(63) Continuation-in-part of application No. 10/645,821, filed on Aug. 20, 2003, and a continuation-in-part of application No. 10/001,895, filed on Nov. 19, 2001, now Pat. No. 7,263,659, and a continuation-in-part of application No. 10/001,894, filed on Nov. 19, 2001, now Pat. No. 7,149,957, and a continuation-in-part of application No. 10/001,849, filed on Nov. 19, 2001, now Pat. No. 7,263,671, and a continuation-in-part of application No. 10/001,891, filed on Nov. 19, 2001, and a continuation-in-part of application No. 10/001,893, filed on Nov. 19, 2001, now Pat. No. 7,266,782, and a continuation-in-part of application No. 10/175,540, filed on Jun. 18, 2002, now Pat. No. 7,215,436, and a continuation-in-part of application No. 10/814,944, filed on Mar. 30, 2004, which is a continuation-in-part of application No. 10/081,129, filed on Feb. 21, 2002, and a continuation-in-part of application No. 10/701,966, filed on Nov. 4, 2003, and a continuation-in-part of application No. 10/465,027, filed on Jun. 18, 2003, said application No. 10/814,944 is a continuation-in-part of application No. 10/465,022, filed on Jun. 18, 2003, and a continuation-in-part of application No. 10/174,522, filed on Jun. 17, 2002, and a continuation-in-part of application No. 10/795,031, filed on Mar. 3, 2004, application No. 11/021,303, which is a continuation-in-part of application No. 10/814,844, filed on Mar. 30, 2004.

(60) Provisional application No. 60/506,303, filed on Sep. 25, 2003, provisional application No. 60/506,206, filed on Sep. 25, 2003, provisional application No. 60/434,314, filed on Dec. 17, 2002, provisional application No. 60/506,411, filed on Sep. 25, 2003, provisional application No. 60/506,263, filed on Sep. 25, 2003.

(51) Int. Cl.
*G06F 3/00* (2006.01)
*G06F 3/14* (2006.01)

(52) U.S. Cl. .................. 715/838; 715/716; 715/719; 715/835; 715/764; 715/205; 358/1.1; 358/540

(58) Field of Classification Search ................ 715/700, 715/716, 717, 719, 727, 764, 835, 838, 839, 715/855, 200, 201, 202, 203, 205, 234, 273; 705/55; 358/1.1, 1.15, 1.18, 530, 540; 382/173
See application file for complete search history.

(56) References Cited

U.S. PATENT DOCUMENTS 4,417,239 A      11/1983      Demke et al.

(Continued)

FOREIGN PATENT DOCUMENTS

CA      2 386 829 A1      11/2002

(Continued)

OTHER PUBLICATIONS

U.S. Appl. No. 11/636,391, filed Dec. 7, 2006, Hull et al.

(Continued)

*Primary Examiner*—X. L Bautista
(74) *Attorney, Agent, or Firm*—Townsend and Townsend and Crew LLP

(57) ABSTRACT

Techniques for generating a static representation of time-based media information. A static representation is generated that comprises a timeline representing the duration of the time-based media information. Occurrences of one or more events that occur in the time-based representation are indicated along the timeline in the static representation. The static representation may be printed on a paper medium.

16 Claims, 9 Drawing Sheets

U.S. PATENT DOCUMENTS

| | | |
|---|---|---|
| 4,481,412 A | 11/1984 | Fields |
| 4,823,303 A | 4/1989 | Terasawa |
| 4,831,610 A | 5/1989 | Hoda et al. |
| 5,059,126 A | 10/1991 | Kimball |
| 5,153,831 A | 10/1992 | Yianilos |
| 5,237,648 A | 8/1993 | Mills et al. |
| 5,250,787 A | 10/1993 | Arii et al. |
| 5,258,880 A | 11/1993 | Takahashi |
| 5,309,359 A | 5/1994 | Katz et al. |
| 5,349,658 A | 9/1994 | O'Rourke et al. |
| 5,382,776 A | 1/1995 | Arii et al. |
| 5,384,703 A | 1/1995 | Withgott et al. |
| 5,404,295 A | 4/1995 | Katz et al. |
| 5,418,948 A | 5/1995 | Turtle |
| 5,438,426 A | 8/1995 | Miake et al. |
| 5,442,795 A | 8/1995 | Levine et al. |
| 5,467,288 A | 11/1995 | Fasciano et al. |
| 5,479,600 A | 12/1995 | Wroblewski et al. |
| 5,480,306 A | 1/1996 | Liu |
| 5,481,666 A | 1/1996 | Nguyen et al. |
| 5,485,554 A | 1/1996 | Lowitz et al. |
| 5,572,651 A | 11/1996 | Weber et al. |
| 5,576,950 A | 11/1996 | Tonomura et al. |
| 5,596,698 A | 1/1997 | Morgan |
| 5,596,700 A | 1/1997 | Darnell et al. |
| 5,600,775 A | 2/1997 | King et al. |
| 5,624,265 A | 4/1997 | Redford et al. |
| 5,627,936 A | 5/1997 | Prasad et al. |
| 5,628,684 A | 5/1997 | Bouedec |
| 5,638,543 A | 6/1997 | Pedersen et al. |
| 5,640,193 A | 6/1997 | Wellner |
| 5,661,506 A | 8/1997 | Lazzouni et al. |
| 5,675,752 A | 10/1997 | Scott et al. |
| 5,680,636 A | 10/1997 | Levine et al. |
| 5,682,540 A | 10/1997 | Klotz et al. |
| 5,694,559 A | 12/1997 | Hobson et al. |
| 5,706,097 A | 1/1998 | Schelling et al. |
| 5,721,897 A | 2/1998 | Rubinstein |
| 5,737,599 A | 4/1998 | Rowe et al. |
| 5,745,756 A | 4/1998 | Henley |
| 5,748,805 A | 5/1998 | Withgott et al. |
| 5,749,735 A | 5/1998 | Redford et al. |
| 5,751,283 A | 5/1998 | Smith |
| 5,758,037 A | 5/1998 | Schroeder |
| 5,761,655 A | 6/1998 | Hoffman |
| 5,764,368 A | 6/1998 | Shibaki et al. |
| 5,778,397 A | 7/1998 | Kupiec et al. |
| 5,781,785 A | 7/1998 | Rowe et al. |
| 5,784,616 A | 7/1998 | Horvitz |
| 5,790,114 A | 8/1998 | Geaghan et al. |
| 5,793,869 A | 8/1998 | Claflin, Jr. |
| 5,804,803 A | 9/1998 | Cragun et al. |
| 5,809,318 A | 9/1998 | Rivette et al. |
| 5,819,301 A | 10/1998 | Rowe et al. |
| 5,832,474 A | 11/1998 | Lopresti et al. |
| 5,838,317 A | 11/1998 | Bolnick et al. |
| 5,857,185 A | 1/1999 | Yamaura |
| 5,860,074 A | 1/1999 | Rowe et al. |
| 5,869,819 A | 2/1999 | Knowles et al. |
| 5,870,770 A | 2/1999 | Wolfe |
| 5,873,107 A | 2/1999 | Borovoy et al. |
| 5,892,536 A | 4/1999 | Logan et al. |
| 5,894,333 A | 4/1999 | Kanda et al. |
| 5,895,476 A | 4/1999 | Orr |
| 5,898,166 A | 4/1999 | Fukuda |
| 5,898,709 A | 4/1999 | Imade et al. |
| 5,933,829 A | 8/1999 | Durst et al. |
| 5,933,841 A | 8/1999 | Schumacher et al. |
| 5,938,727 A | 8/1999 | Ikeda |
| 5,939,699 A | 8/1999 | Pertunen |
| 5,941,936 A | 8/1999 | Taylor |
| 5,943,679 A | 8/1999 | Niles et al. |
| 5,945,998 A | 8/1999 | Eick |
| 5,946,678 A | 8/1999 | Aalbersberg |
| 5,949,879 A | 9/1999 | Berson et al. |
| 5,950,187 A | 9/1999 | Tsuda |
| 5,962,839 A | 10/1999 | Eskildsen |
| 5,978,773 A | 11/1999 | Hudetz et al. |
| 5,986,692 A | 11/1999 | Logan et al. |
| 5,987,454 A | 11/1999 | Hobbs |
| 5,999,173 A | 12/1999 | Ubillos |
| 6,005,562 A | 12/1999 | Shiga et al. |
| 6,006,218 A | 12/1999 | Breese et al. |
| 6,006,241 A | 12/1999 | Purnaveja et al. |
| 6,021,403 A | 2/2000 | Horvitz et al. |
| 6,026,409 A | 2/2000 | Blumenthal |
| 6,028,601 A | 2/2000 | Machiraju et al. |
| 6,055,542 A | 4/2000 | Nielsen et al. |
| 6,061,758 A | 5/2000 | Reber et al. |
| 6,076,733 A | 6/2000 | Wilz et al. |
| 6,076,734 A | 6/2000 | Dougherty et al. |
| 6,081,261 A | 6/2000 | Wolff et al. |
| 6,094,648 A | 7/2000 | Aalbersberg |
| RE36,801 E | 8/2000 | Logan et al. |
| 6,098,082 A | 8/2000 | Gibbon et al. |
| 6,101,503 A | 8/2000 | Cooper et al. |
| 6,108,656 A | 8/2000 | Durst et al. |
| 6,111,567 A | 8/2000 | Savchenko et al. |
| 6,125,229 A | 9/2000 | Dimitrova et al. |
| 6,138,151 A | 10/2000 | Reber et al. |
| 6,148,094 A | 11/2000 | Kinsella |
| 6,151,059 A | 11/2000 | Schein et al. |
| 6,152,369 A | 11/2000 | Wilz et al. |
| 6,160,633 A | 12/2000 | Mori |
| 6,182,090 B1 | 1/2001 | Peairs |
| 6,199,042 B1 | 3/2001 | Kurzweil |
| 6,199,048 B1 | 3/2001 | Hudetz et al. |
| 6,211,869 B1 | 4/2001 | Loveman et al. |
| 6,256,638 B1 | 7/2001 | Dougherty et al. |
| 6,262,724 B1 | 7/2001 | Crow et al. |
| 6,297,812 B1 | 10/2001 | Ohara et al. |
| 6,307,956 B1 | 10/2001 | Black |
| 6,330,976 B1 | 12/2001 | Dymetman et al. |
| 6,360,057 B1 | 3/2002 | Tsumagari et al. |
| 6,360,234 B2 * | 3/2002 | Jain et al. .................. 715/201 |
| 6,369,811 B1 | 4/2002 | Graham et al. |
| 6,421,067 B1 | 7/2002 | Kamen et al. |
| 6,430,554 B1 | 8/2002 | Rothschild |
| 6,434,561 B1 | 8/2002 | Durst, Jr. |
| 6,476,834 B1 | 11/2002 | Doval et al. |
| 6,496,856 B1 | 12/2002 | Kenner et al. |
| 6,502,756 B1 | 1/2003 | Fanghraevs |
| 6,504,620 B1 * | 1/2003 | Kinjo ...................... 358/1.15 |
| 6,505,153 B1 | 1/2003 | Van Thong et al. |
| 6,518,986 B1 | 2/2003 | Mugura |
| 6,529,920 B1 | 3/2003 | Arons et al. |
| 6,535,639 B1 | 3/2003 | Uchihachi et al. |
| 6,542,933 B1 | 4/2003 | Durst, Jr. |
| 6,544,294 B1 * | 4/2003 | Greenfield et al. .......... 715/234 |
| 6,546,385 B1 | 4/2003 | Mao et al. |
| 6,567,980 B1 | 5/2003 | Jain et al. |
| 6,568,595 B1 | 5/2003 | Russell et al. |
| 6,581,070 B1 | 6/2003 | Gibbon et al. |
| 6,587,859 B2 | 7/2003 | Dougherty et al. |
| 6,596,031 B1 | 7/2003 | Parks |
| 6,608,563 B2 | 8/2003 | Weston et al. |
| 6,623,528 B1 | 9/2003 | Squilla et al. |
| 6,625,334 B1 | 9/2003 | Shiota et al. |
| 6,636,869 B1 | 10/2003 | Reber et al. |
| 6,647,534 B1 | 11/2003 | Graham |
| 6,647,535 B1 | 11/2003 | Bozdagi et al. |
| 6,651,053 B1 | 11/2003 | Rothschild |
| 6,665,838 B1 | 12/2003 | Brown et al. |
| 6,675,165 B1 | 1/2004 | Rothschild |

| | | | | | | |
|---|---|---|---|---|---|---|
| 6,684,368 | B1 | 1/2004 | Hull et al. | 2004/0064339 A1 | 4/2004 | Shiota et al. |
| 6,701,369 | B1 | 3/2004 | Philyaw | 2004/0071441 A1 | 4/2004 | Foreman et al. |
| 6,728,466 | B1* | 4/2004 | Tanaka ............... 386/46 | 2004/0100506 A1 | 5/2004 | Shiota et al. |
| 6,745,234 | B1 | 6/2004 | Philyaw et al. | 2004/0118908 A1 | 6/2004 | Ando et al. |
| 6,753,883 | B2 | 6/2004 | Schnea et al. | 2004/0128514 A1 | 7/2004 | Rhoads |
| 6,760,541 | B1 | 7/2004 | Ohba | 2004/0143459 A1 | 7/2004 | Engleson et al. |
| 6,766,363 | B1 | 7/2004 | Rothschild | 2004/0167895 A1 | 8/2004 | Carro |
| 6,771,283 | B2 | 8/2004 | Carro | 2004/0181747 A1 | 9/2004 | Hull et al. |
| 6,772,947 | B2 | 8/2004 | Shaw | 2004/0181815 A1 | 9/2004 | Hull et al. |
| 6,781,609 | B1 | 8/2004 | Barker et al. | 2004/0229195 A1 | 11/2004 | Marggraff et al. |
| 6,845,913 | B2 | 1/2005 | Madding et al. | 2004/0247298 A1 | 12/2004 | Ohba |
| 6,865,608 | B2 | 3/2005 | Hunter | 2005/0038794 A1 | 2/2005 | Piersol |
| 6,865,714 | B1 | 3/2005 | Liu et al. | 2005/0083413 A1 | 4/2005 | Reed et al. |
| 6,871,780 | B2 | 3/2005 | Nygren et al. | 2005/0149849 A1 | 7/2005 | Graham et al. |
| 6,883,162 | B2 | 4/2005 | Jackson et al. | 2005/0213153 A1 | 9/2005 | Hull et al. |
| 6,886,750 | B2 | 5/2005 | Rathus et al. | 2005/0216852 A1 | 9/2005 | Hull et al. |
| 6,898,709 | B1 | 5/2005 | Teppler | 2005/0223322 A1 | 10/2005 | Graham et al. |
| 6,923,721 | B2 | 8/2005 | Luciano et al. | 2006/0043193 A1 | 3/2006 | Brock |
| 6,931,594 | B1 | 8/2005 | Jun | 2006/0136343 A1 | 6/2006 | Coley et al. |
| 6,946,672 | B1 | 9/2005 | Lapstun | 2006/0171559 A1 | 8/2006 | Rhoads |
| 6,950,623 | B2 | 9/2005 | Brown et al. | | | |
| 6,966,495 | B2 | 11/2005 | Lynggaard et al. | | | |
| 6,993,573 | B2 | 1/2006 | Hunter | | | |
| 7,089,420 | B1 | 8/2006 | Durst et al. | | | |
| 7,093,191 | B1* | 8/2006 | Jain et al. ............ 715/201 | | | |
| 7,131,058 | B1 | 10/2006 | Lapstun | | | |
| 7,134,016 | B1 | 11/2006 | Harris | | | |
| 7,134,074 | B2* | 11/2006 | Munetsugu et al. ..... 715/204 | | | |
| 7,149,957 | B2 | 12/2006 | Hull et al. | | | |
| 7,152,206 | B1 | 12/2006 | Tsuruta | | | |
| 7,181,502 | B2 | 2/2007 | Incertis | | | |
| 7,215,436 | B2 | 5/2007 | Hull et al. | | | |
| 7,228,492 | B1 | 6/2007 | Graham | | | |
| 7,263,659 | B2 | 8/2007 | Hull et al. | | | |
| 7,263,671 | B2 | 8/2007 | Hull et al. | | | |
| 7,280,738 | B2 | 10/2007 | Kauffman et al. | | | |

FOREIGN PATENT DOCUMENTS

| | | |
|---|---|---|
| EP | 248 403 A2 | 12/1987 |
| EP | 378 848 A2 | 7/1990 |
| EP | 737 927 A2 | 10/1996 |
| EP | 459 174 B1 | 11/1996 |
| EP | 762 297 A2 | 3/1997 |
| EP | 788 063 A2 | 6/1997 |
| EP | 788 064 A2 | 6/1997 |
| EP | 802 492 A1 | 10/1997 |
| GB | 2 137 788 A | 10/1984 |
| GB | 2 156 118 A | 10/1985 |
| GB | 2 234 609 A | 2/1991 |
| GB | 2 290 898 A | 1/1996 |
| GB | 2 331 378 A | 5/1999 |
| JP | 04-021165 A | 1/1992 |
| JP | 8-297677 A | 11/1996 |
| WO | WO 99/18523 A1 | 4/1999 |
| WO | WO 02/082316 A1 | 10/2002 |

OTHER PUBLICATIONS

"About Telus investors glossary," pp. 1-7 downloaded from http://about.telus.com/investors/glossary.html on Apr. 14, 2005.

Choi, et al., "An Integrated Data Model and a Query Language for Content-Based Retrieval of Video," *MIS '98 LNCS 1508*, Springer Verlag Berlin Heidelberg, pp. 192-198 (1998).

"Computer Terms," pp. 1-8 downloaded from http:www.park-meadow.org/computer_terms.htm on Apr. 14, 2005.

"Glossary for computer hardware and micro scope," pp. 1-11 downloaded from http://www.mumbaicyber.com/glossary_com_hardware_micro.asp on Apr. 14, 2005.

"Glossary: What Does It Mean!," pp. 1-3 downloaded from http://www.fairfield.k12.ct.us/fairfieldhs/cfairfieldhs03/glossary.htm on Apr. 14, 2005.

"IT&T Talk", pp. 1-4 dopwnloaded from http://www.iib.qld.gov.au/itcareers/talk.asp on Apr. 14, 2005.

Lamming et al., "Using Automatically Generated Descriptions of Human Activity to Index Multi-Media Data," IEEE Multimedia Communications and Applications IEE Colloquium, Feb. 7, 1991, abstract and pp. May 1-May 2.

"Multimedia" pp. 1-2 downloaded from http://en.wikipedia.org/wiki/Multimedia on Apr. 14, 2005.

Ohmori, Y., "A Tool for Programmable Access to Organized Multimedia Data—Enhanced MultiMedia Recorder (EMMR)," *Joho Shori Gakkai Kenkyu Hokoku*, 98(35 [HI-78]):39-44 (1998).

Phillips, R. L., "MediaView: A General Multimedia Digital Publication System," *Communications of the ACM*, 34(7):75-83 (1991).

Roschelle et al., "VideoNoter: A productivity too for video data analysis," *Behavior Research Methods, Instruments & Computers*, 23(2):219-224 (1991).

Saur et al., "Automated Analysis and Annotation of Basketball Video," *SPIE*, 3022:176-187.

Acrobat Reader Version 2.0 (software application), Adobe Systems Incorporated, screenshots Figures 1-10 (1994).

Adobe Premiere (video editing software) from Http://www.adobe.com (2002).

Adobe Acrobat Reader 3.0 screen dumps (fig. 1-3), (1996).

Adobe Systems, Inc., "Adobe Photoshop 4.0 User Guide for Macintosh and Windows," pp. 30-31 (1996).

Apple Macintosh system 7 reference manual, pp. 30-31 (1991).

Ball et al. "Software Visualization in the Large", IEEE Computer, 29: 33-43 (1996).

Begole et al., "Flexible Collaboration Transparency," doc. ID: ncstrl.vatech_cs/TR-98-11, Virginia Polytechnic Institute and State University (1998).

Begole et al., "Supporting Worker Independence in Collaboration Transparency," doc. ID: ncstrl.vatech_cs/TR-98-12, Virginia Polytechnic Institute and State University (1998).

Bobick et al. "A State Based Approach to the Representation and Recognition of Gesture," IEEE Trans. on Pattern Analysis and Machine Intelligence, pp. 1325-1337 (1997).

Boguraev• et al. "Salience-Based Content Characterisation of Text Documents," *Proceedings of the ACL/EACL Workshop on Intellegent [Sic] Scalable Text Summarization*, 1997. Topic identification, Discourse-based summarization. pp. 1-12 (1997).

Boreczky, J. et al. "An Interactive Comic Book Presentation for Exploring Video," Conference on Human factors in Computing Systems (CHI 2000), ACM Press, pp. 185-192, 2000.

Boykin et al, "Improving Broadcast News Segmentation Processing," IEEE Multimedia '99 (1999).

Boykin et al. " Machine learning of Event Segmentation for News on Demand," Communications of the ACM, 43:35-41(2000).

Brandow et al. "Automatic Condensation of Electronic Publications by Sentence Selection," *Information Processing and Management*, 31(5):675-685 (1995).

Brown et al. "Automatic Content-Based Retrieval of Broadcast News," ACM Multimedia 5, San Francisco, CA (1995).

Byrd, D., "A Scrollbar-based Visualization for Document Navigation," doc. ID: xxx.cs.IR/9902028, Computing Research Repository: Information Retrieval (1999).

Caj et al. "Integrated Multimedia Publishing—Combining TV and Newspaper Content on Personal Channels," WWW8 Conference, 1999.

Chen et al. "Emotion Recognition from Audiovisual information," Proc. IEEE Workshop on Multimedia Signal Processing, Los Angeles, CA, USA, pp. 83-88.(1998).

Chen et al. "ViBE: A Video Indexing and Browsing Environment," Proceedings of the SPIE Conference on Multimedia Storage and Archiving Systems Sep. 20-22, 1999, Boston 3846:148-164 (1999).

Chiu et al. "NoteLook: Taking Notes in Meetings with Digital Video and Ink," ACM Multimedia 99 Orlando, (1999).

Chiu et al. "Automatically linking multimedia meeting documents by image matching," Proceedings of Hypertext '00. ACM, New York, pp. 244-245 (2000).

Christel et al. "Evolving Video Skims into Useful Multimedia Abstractions," Proceedings of the CHI '98 Conference on Human Factors in Computing Systems (Los Angeles, CA, Apr. 1998), pp. 171-178 (1998).

Christel et al. "Information Visualization within a Digital Video Library," Journal of Intelligent Information Systems 11:235-257 (1998).

Dellaert et al. "Recognizing emotion in speech," Proceedings ICSLP 96. Fourth International Conference on Spoken Language Processing New York (Cat. No. 96TH8206). IEEE. vol:1970-1973 (1996).

Dimitrova et al. "Video Keyframe Extraction and Filtering: A Keyframe is not a Keyframe to Everyone," CIKM 1997:113-120 (1997).

Doermann et al. "Applying Algebraic and differential invarients for logo recognition," Machine Vision and Applications 9:73-86 (1996).

Donato et al. "Classifying Facial Actions", IEEE Trans. on Pattern Analysis and Machine Intelligence, 21:974-989 (1999).

Drucker et al. "SmartSkip: Consumer Level Browsing and Skipping of Digital Video Content," Paper: Technology to Help People Find Information, vol. No: 4, Issue No. 1, pp. 219-226, Minneapolis, Minnesota, USA, (Apr. 20-25, 2002).

Essa et al. Coding Analysis Interpretation and Recognition of Facial Expressions, IEEE Trans. on Pattern Analysis and Machine Intelligence, 19:757-763 (1997).

Face recognition techniques described at web site http://www.visionics.com (2002).

"Flexible JAMM Screenshots," downloaded from internet site http://simon.cs.ct.edu/-jamm May 4, 2000.

Foote, Jonathan, et al. "An Intelligent Media Browser using Automatic Multimodal Ananlysis," ACM Multimedia 8, Bristol, UK (1998).

"Fujitsu Markets Facsimile Connection System for Computer I/O," *Comline Telecommunications*, Nov. 1989, p. 5.

Furui et al. "Japanese Broadcast News Transcription and Information Extraction," Communications of the ACM, 43(2):71-73, Feb 2000.

Gauvain et al. "Transcribing Broadcast News for Audio and Video Indexing," Communications of the ACM, 43:64-70 (2000).

Gibbon "Generating Hypermedia Documents from Transcriptions of Television Programs Using Parallel Text Alignment," *Handbook of Internet and Multimedia Systems and Applications*, David C. Gibbon; CRC Press, (1998).

Gliedman "Virtual Office Managers," Computer Shopper, 18:290 (1998).

Gordon "Using annotated video as an information retrieval interface," ACM Proceedings of the 5th international Conference on Intelligent User Interfaces New Orleans pp. 133-140 (2000).

Greenberg et al., "Sharing fisheye views in relaxed-WYSIWIS groupware applications," *Proceedings of Graphics Interface*, Toronto, Canada, May 22-24, 1995, Distributed by Morgan-Kaufmann, pp. 28-38, http://www.cpsc.ucalgary.ca/grouplab/papers/1996/96-Fisheye.GI/gi96 fisheye.html.

Grunin, L., "Action," *PC Magazine*, 12(15):240 (1993).

"Hang on—Blue Sky's WinHelp is on the way," *PC Week*, p. 59, Jul. 1995.

Hauptmann et al. "Text, speech and vision for video segmentation: the informedia project," Proc. AAAI Fall Symp. Computational Models for Integrating Language and Vision, Boston, MA, Nov. 10-12,1995.

Hauptmann et al. "Story Segmentation and Detection of Commercials in Broadcast News Video," Advances in Digital Libraries Conference, Santa Barbara, CA, Apr. 22-23 1998.

He et al. "Comparing Presentation Summaries: Slides vs. Reading vs. Listening," Conference on Human factors in Computing Systems (CHI 2000), Apr. 1-6, 2000.

Hearst et al. "TileBars: Visualization of Term Distribution Information in Full Text Information Access," *Proceedings of the ACM SIGCHI Conference on Human Factors in Computing Systems (CHI), Denver, CO., May 1995, pp. 1-8, http://www.acm.org/sigchi/chi95/Electronic/documnts/papers/mah__bdy__htm.*

Hecht "Embedded data glyph Technology for Hardcopy Digital Documents," Proc. SPIE 2171:341-352 (1994).

Hecht "Printed Embedded Data Graphical User Interfaces," IEEE Computer, Mar. 2001.

Hill et al. "Edit Wear and Read Wear", ACM, pp. 3-9 (May 3-7, 1992).

Hu et al. "Multimedia Description Framework (MDF) for content descriptions of Audio/Video Documents," Fourth ACM Conference on Digital Libraries (DL '99) Aug. 11-14, 1999.

IBM Technical Disclosure Bulletin, "Quick Selection of Window Environment Coordinates," 35:57-60, ISS # 4B, (1992).

"IBM, Partners Team on Web-Based Image Search, Printing Sep. 29, 1995," Newsbytes News Network, Sep. 1995.

Identitech, "Identitech announces FYI 2.5.2 release with NT object server, SmartForm, and ODBC," Business Editors, Jul. 1996.

"Identitech Unysis: Unysis wins Florida Housing Finance Agency Contract; ldentitech provides workflow software solution," Business Editors/Computer Writers, Jun. 1995.

Ioffe et al. "Finding people by sampling," Proc. International Conference on Computer Vision, pp. 1092-1097 (1999).

Jin et al. "Topic Tracking for Radio, TV Broadcast, and Newswire," Proceedings of the DARPA Broadcast News Workshop, Feb. 28-Mar. 3, 1999, Herndon, VA.

Komlodi et al. "Key Frame Preview Techniques for Video Browsing," (Proceedings of the 3rd ACM International Conference on Digital Libraries, Jun. 23-26, 1998, Pittsburgh, pp. 118-125 (1998).

Lam et al. "Automatic document classification based on probabilistic reasoning: model and performance analysis," *IEEE*, 3:2719-2723 (1997).

Langley "An Analysis of Bayesian Classifiers," Proceedings of the Tenth National Conference on Artificial Intelligence, pp. 223-228, 1992.

Langley "Induction of Selective Bayesian Classifiers," Proceedings of the Tenth National Conference on Uncertainty in Artificial Intelligence, pp. 400-406, (1994).

Li et al. "Automatic Text Detection and Tracking in Digital Video," IEEE Transactions on Image Processing—Special Issue on Image and Video Processing for Digital Libraries, 9:147-156 (2000).

Li et al. "Text Extraction and Recognition in Digital Video," Proceedings of Third LAPR Workshop on Document Analysis Systems, pp. 119-128, 1998.

Li et al. "Vision: a digital video library," Proceedings of the 1st ACM International Conference on Digital Libraries, pp. 19-27, 1996.

Liang et al. "Practical video indexing and retrieval system," *SPIE*, 3240:294-303 (1988).

Lienhart et al. "On the Detection and Recognition of Television Commercials," Proc. IEEE Conf. on Multimedia Computing and Systems, Ottawa, Canada, pp. 509-516, Jun. 1997.

Lison et al., "Sight and Sound," *Unix Review*, 7(1 0):76-86 (1989).

Ma et al. "An Indexing and Browsing System for Home Video," Invited paper, EUSIPCO '2000, 10th European Signal Processing Conference, Sep. 5-8, 2000, Tampere, Finland.

Manber "The Use of Customized Emphasis in Text Visualization," *Proceedings of 1997 IEEE Conf. on Information Visualization*, pp. 132-138, (1997).

Maybury "News on Demand," Communications of the ACM, 43:33-34 (2000).

Maybury et al. "Segmentation, Content Extraction and Visualization of Broadcast News Video Using Multistream Analysis," AAAI Paper (1997).

Maybury et al. "Multimedia Summaries of Broadcast News," International Conference on Intelligent Information Systems pp. 447-449 (1997).

Maybury et al. "Multimedia Summaries of Broadcast News," International Conference on Intelligent Information Systems, Dec. 8-10, 1997.

Merialdo et al. "Automatic Construction of Personalized TV News Programs," Seventh ACM International Multimedia Conference, Orlando Nov. 1999.

Merlino et al. "Broadcast News Navigation using Story Segmentation," Advanced Information Systems Center, The MITRE Corporation (1997).

Merlino et al. "Broadcast News Processing Techniques," MITRE Technical Report, MTR 99B0000031, Apr. 1999.

Mohan "Text-based search of TV news stories," Proc. SPIE 2916:2-13 (1996).

Myers et al. "Multi-View Intelligent Editor for Digital Video Libraries," First ACM and IEEE Joint Conference on Digital Libraries, Jun. 24-28, 2001, Roanoke, VA, pp. 106-115.

Oh et al. "Efficient and Cost-effective Techniques for Browsing and Indexing Large Video Databases," SIGMOD Conference 2000: 415-426.

Okada et al., "Development of Application Programs for Distributed Processing Equipment " *Review of the Electrical Communication Laboratories*, 34(4):465-471 (1986).

Photina et al. "Improving acoustic models with captioned multimedia speech." Proceedings IEEE International Conference on Multimedia Computing and Systems, 2:767-71 (1999).

Rowley et al. "Neural network-based face detection," IEEE Transactions on Pattern Analysis and Machine Intelligence, 20:23-38 (1998).

Schweighofer et al. "The Automatic Generation of Hypertext Links in Legal Documents," *Lecture Notes in Computer Science*, vol. 1134, Wagner et al., eds., from 7th Int. Conf., DEXA 96', held Sep. 1996 in Zurich, Switzerland (1996).

Shahraray et al. "Automated Authoring of Hypermedia Documents of Video Programs," *ACM Multimedia 95*, Nov. 5-9, 1995, San Francisco, CA (1995).

Shahraray et al. "Automatic generation of pictorial transcripts of video programs," Proceedings of the SPIE- Int. Soc. Opt. Eng. 2417:512-518 (1995).

Shahraray et al. "Pictorial transcripts: multimedia processing applied to digital library creation," 1997 IEEE First Workshop on Multimedia Signal Processing pp. 581-586 (1997).

Product Brochure, Shutterfly, downloaded from http://www.shutterfly.com on. Mar. 15, 2005 (10 pages).

Smith et al. "Video Skimming and Characterization through the Combination of Image and Language Understanding," Computer Vision and Pattern Recognition IEEE 1997.

Sodergard et al., "Integrated multimedia publishing—combining TV and newspaper content on personal channels," downloaded from http:www8.org/w8-papers/1b-multimedia/integrated/integrated.html on Apr. 4, 2002, pp. 1-22.

Sonmez et al. "Multiple speaker tracking and detection: handset normalization and duration scoring," Digital Signal Processing 10:133-143 (2000).

"Spry INC.'S Internet Front End Picked for PSI Cable Internet Service," *Information & Interactive Services Report*, 15(7), (1994).

Strattner, A., "HP pioneers I-TV peripheral market," *Computer Shopper*, 14(2):71 (1994).

Suda et al. "Logo and word matching using a general approach to signal registration," Fourth International Conference on Document Analysis and Recognition, Ulm, Germany, Aug. 18-20, 1997, pp. 61-65.

Sumita et al. "Document Structure Extraction for Interactive Document Retrieval Systems," *Proceedings of SIGDOC 93*, pp. 301-310, (1993).

Taghva et al. "An Evolution of an Automatic Markup System " *SPIE*, 2422:317-327 (1995).

TAXT "Segmentation of Document Images," IEEE 11:1322-1329 (1989).

Tennenhouse et al. "A software-oriented approach to the design of media processing environments," Proceedings of the IEEE International Conference on Multimedia Computing and Systems, pp. 435-444 (1994).

Tonomura et al. "VideoMAP and VideoSpaceIcon : tools for anatomizing video content," Proc. INTERCHI '93 ACM pp. 131-136 (1993).

Uchihashi et al. "Summarizing Video Using a Shot Importance Measure and a Frame-Packing Algorithm," Proceedings of the International Conference on Acoustics, Speech, and Signal Processing (Phoenix, AZ) 6:3041-3044 (1999).

Uchihashi et al. "Video Manga: Generating Semantically Meaningful Video Summaries," *ACM Multimedia 99*, Orlando, Florida, Oct. 30-Nov. 5, 1999.

Van Horn-Christopher, "Have you talked to your computer today?," *Business Forum*, 19(3):10-11 (1994).

Video content management and publishing software from Virage http://www.virage.com (2002).

"Video Mail Retrieval Using Voice" Cambridge University Engineering Department Computer Laboratory and Olivetti Research Laboratory summary of research found at http://svr- www.eng.cam.ac.uk/research/projects/vmr/ (1997).

"VNR firm offers Storyboards" PR News, Dec. 4, 1995, downloaded from http://proquest.umi.com/pqdlink?index=20&did=000000010830394&SrchMode=3&sid—1&F on Aug. 9, 2004.

"WC3 issues first public draft of Synchronized Multimedia Integration Language (SMIL)," *Information Today*, 15(2):27 (1998) downloaded on May 28, 2004.

Wactlar et al. "Complementary Video and Audio Analysis for Broadcast News Archives," Communications of the ACM, 43:42-47 (2000).

Wactler et al. "Intelligent access to digital video: Informedia project," Computer 29:46-52 (1996).

Weiss et al. "Composition and Search with a Video Algebra," IEEE Multimedia 2:12-25 (1995).

Wittenburg et al. "Browsing with Dynamic Key Frame Collages in Web-Based Entertainment Video Services," In Proceedings of IEEE International Conference on Multimedia Computing and Systems, Jun. 7-11, 1999, Florence, Italy 2:913-918 (1999).

"c:\. . . \9149920c.wpd—unmodified" Screen Shots of document created in Corel WordPerfect, 4 pages, (Apr. 30, 2002).

Product Brochure, YesVideo, downloaded from http://www.yesvideo.com/code on Mar. 15, 2005 (20 pages).

Zhang et al. "Detection of text Captions in Compressed domain Video," International Multimedia Conference Proceedings of the 2000 ACM workshops on Multimedia 2000 , Los Angeles, California, United States pp. 201-204.

* cited by examiner

TECHNIQUES FOR GENERATING A STATIC REPRESENTATION FOR TIME-BASED MEDIA INFORMATION

CROSS-REFERENCES TO RELATED APPLICATIONS

The present application claims priority from and is a continuation-in-part (CIP) application of the following applications, the entire contents of which are incorporated herein by reference for all purposes:

(1) U.S. application Ser. No. 10/001,895, "PAPER-BASED INTERFACE FOR MULTIMEDIA INFORMATION", filed Nov. 19, 2001;

(2) U.S. application Ser. No. 10/001,894, "TECHNIQUES FOR RETRIEVING MULTIMEDIA INFORMATION USING A PAPER-BASED INTERFACE", filed Nov. 19, 2001;

(3) U.S. application Ser. No. 10/001,849, "TECHNIQUES FOR ANNOTATING MULTIMEDIA INFORMATION", filed Nov. 19, 2001;

(4) U.S. application Ser. No. 10/001,891, "PAPER-BASED INTERFACE FOR MULTIMEDIA INFORMATION STORED BY MULTIPLE MULTIMEDIA DOCUMENTS", filed Nov. 19, 2001;

(5) U.S. application Ser. No. 10/001,893, "TECHNIQUES FOR GENERATING A COVERSHEET FOR A PAPER-BASED INTERFACE FOR MULTIMEDIA INFORMATION", filed Nov. 19, 2001;

(6) U.S. application Ser. No. 10/175,540, "DEVICE FOR GENERATING A MULTIMEDIA PAPER DOCUMENT", filed Jun. 18, 2002;

(7) U.S. application Ser. No. 10/645,821, "PAPER-BASED INTERFACE FOR SPECIFYING RANGES", filed Aug. 20, 2003;

The present application is also related to the following co-pending patent applications, each of which is hereby incorporated by reference in its entirety for all purposes:

U.S. patent application entitled, "Printer Having Embedded Functionality for Printing Time-Based Media," to Hart et al., filed Mar. 30, 2004;

U.S. patent application entitled, "Printer With Hardware and Software Interfaces for Peripheral Devices," to Hart et al., filed Mar. 30, 2004;

U.S. patent application entitled, "Printer User Interface," to Hart et al., filed Mar. 30, 2004;

U.S. patent application entitled, "User Interface for Networked Printer," to Hart et al., filed Mar. 30, 2004;

U.S. patent application entitled, "Stand Alone Multimedia Printer With User Interface for Allocating Processing," to Hart et al., filed Mar. 30, 2004;

U.S. patent application entitled "Networked Printing System Having Embedded Functionality for Printing Time-Based Media," to Hart, et al., filed Mar. 30, 2004;

U.S. patent application entitled "Printable Representations for Time-Based Media ," to Hull, et. al., filed on Mar. 30, 2004;

U.S. patent application entitled "Printing System with Embedded Audio/Video Content Recognition and Processing," to Hull et. al., filed on Mar. 30, 2004;

U.S. application Ser. No. 10/814,944, "Multimedia Print Driver Dialog Interfaces", filed Mar. 30, 2004; and U.S. application Ser. No. 10/814,844, "Printable Representations for Time-based Media", filed Mar. 30, 2004.

BACKGROUND OF THE INVENTION

The present application relates to the field of time-based media information, and more particularly to techniques for generating a representation of time-based media streams that may be printed on a paper medium.

An increasing amount of information is now available in electronic form. The information may be stored as electronic (or digital) documents. The electronic information may include time-based media information such as audio streams, video streams, animation information, etc. that is captured over a time period. Example of time-based media information includes multimedia information that may include information of one or more different types such as audio information, video information, animation information, etc.

Several different applications and tools are available today for outputting time-based media information to a user. For example, several proprietary and/or customized multimedia players, video players, televisions, personal digital assistants (PDAs), and the like are available for outputting time-based media information. Examples of media players include RealPlayer™ provided by RealNetworks™, Microsoft Windows Media Player™ provided by Microsoft Corporation™, QuickTime™ Player provided by Apple Corporation, Shockwave™ multimedia player, and others. These players generally run on a computer system and output the time-based media information via output devices coupled to the computer such as a monitor, a speaker, and the like.

While retrieving time-based media information in digital form is adequate for many applications, the dynamic nature of the output makes it unfeasible for other applications. For example, the capability to easily review time-based media information is commonly needed today. Conventionally, to search for a particular content within time-based media information, one has to actually playback the time-based media information to find the desired content. For example, a user has to playback audio recording of a radio talk show to determine when a particular guest speaker spoke during the show. There is presently no easy way for a user to search through a time-based media information segment to easily identify features of interest from the time-based media information.

Further, it is a well-known fact that many users find it easier to comprehend and review information when the information is printed on a paper medium. However, techniques for generating static representations of time-based media information that can be printed on a paper medium. Techniques are thus desired that are capable of providing a static representation of time-based media information suitable for printing on a paper medium.

BRIEF SUMMARY OF THE INVENTION

Embodiments of the present invention provide techniques for generating a static representation of time-based media information. According to an embodiment of the present invention, a static representation is generated that comprises a timeline representing the duration of the time-based media information. Occurrences of one or more events that occur in the time-based representation are indicated along the timeline in the static representation. The static representation may be printed on a paper medium.

According to an embodiment of the present invention, techniques are provided for generating a representation of time-based media information. In this embodiment, time-based media information is received. A set of events occurring in the time-based media information between a first time and a second time is determined. For each event in the set of events, a time is determined when the event occurs in the time-based media information. A static representation is generated for the time-based media information. The static representation comprises a timeline having a start point corresponding to the first time and an end point corresponding to the second time, an indication, for each event in the set of events, of when the event occurred along the timeline, and a tag for each event in the set of events, each tag for an event corresponding to a time determined for the event. Each tag enables access to the time-based media information from a time corresponding to the tag. The static representation may be printed on a paper medium.

According to another embodiment of the present invention, techniques are provided for generating a representation of time-based media information. In this embodiment, a set of events to be included in a static representation of the time-based media information is determined, the set of events comprising one or more events occurring in the time-based media information between a first time and a second time. For each event in the set of events, a time when the event occurs in the time-based media information is determined. A static representation is generated for the time-based media information. The static representation comprises (1) a timeline having a start point corresponding to the first time and an end point corresponding to the second time, the timeline comprising a plurality of sections, each timeline section corresponding to a segment of time between the first time and the second time, each timeline section having an associated start time and an end time; (2) an indication, for each event in the set of events, of when the event occurs along the timeline; and (3) a tag for each event in the set of events, each tag for an event corresponding to a time determined for the event, wherein each tag enables access to the time-based media information from a time corresponding to the tag. The static representation may be on a paper medium.

The foregoing, together with other features, embodiments, and advantages of the present invention, will become more apparent when referring to the following specification, claims, and accompanying drawings.

DETAILED DESCRIPTION OF THE INVENTION

Figure 1:
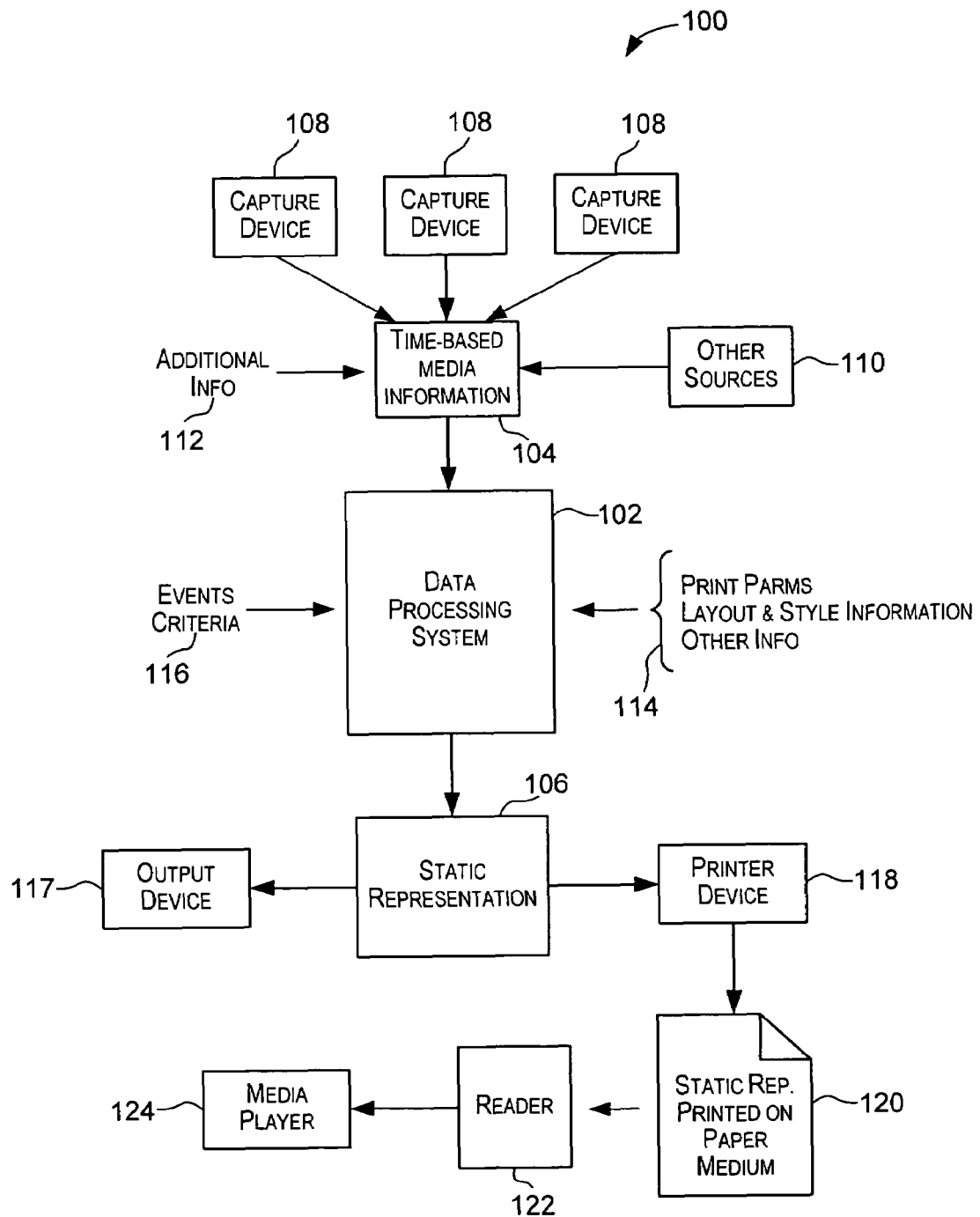
FIG. 1 is a simplified block diagram of a system that may incorporate an embodiment of the present invention.

In the following description, for the purposes of explanation, specific details are set forth in order to provide a thorough understanding of the invention. However, it will be apparent that the invention may be practiced without these specific details.

Embodiments of the present invention provide techniques for generating a static representation of time-based media information. According to an embodiment of the present invention, a static representation is generated that comprises a timeline representing the duration of the time-based media information. Occurrences of one or more events that occur in the time-based representation are indicated along the timeline in the static representation. The static representation may be printed on a paper medium. The paper medium may be any physical medium on which information can be printed, written, drawn, imprinted, embossed, etc. Printing on a paper medium may thus include printing, writing, drawing, imprinting, embossing, etc. the information on a paper medium.

Embodiments of the present invention thus take advantage of the high resolution and portability of paper and provide a readable representation of the time-based media information and an indication of events occurring within the time-based media information. The paper medium may be used to select, retrieve, and access time-based media information. One may use the paper medium on which the static representation is printed to review contents of the time-based media information Time-based media information refers to information that has a temporal component associated with it. Time-based media information generally includes information that is captured or recorded over a period of time. Time-based media information is generally characterized by a start time and an end time. The time period between the start time and end time represents the time duration of the time-based media information. Time-based media information may comprise information of one or more types (or streams) such as audio stream information, video stream information, animation information, etc. or combinations thereof. Time-based media information may include one or more channels, where each channel represents information of a particular type. Multimedia information is an example of time-based media information. Multimedia information may refer to any one of or a combination of text information, graphics information, animation information, audio information, video information, images (e.g., slides, whiteboard images,), etc. Various formats may be used to store the multimedia information such as various MPEG formats (e.g., MPEG 1, MPEG 2, MPEG 3, MPEG 4, MPEG 7, etc.), MP3 format, SMIL format, HTML+TIME format, WMF (Windows Media Format), RM (Real Media) format, Quicktime format, Shockwave format, various image formats (e.g., JPEG, etc.), various streaming media formats, formats being developed by the engineering community, proprietary and customized formats, and others. Time-based media information may comprise media objects of different types such as an audio media object, video media object, etc. The media objects may comprise information one or more types.

FIG. 1 is a simplified block diagram of a system that may incorporate an embodiment of the present invention. FIG. 1 is merely illustrative of an embodiment incorporating the present invention and does not limit the scope of the invention as recited in the claims. One of ordinary skill in the art would recognize other variations, modifications, and alternatives.

As shown in FIG. 1, a data processing system 102 may be configured to generate a static representation 106 for time-based media information 104. Time-based media information 104 may be provided by various sources. For example, the time-based media information may be captured by one or more capture devices 108. Examples of capture devices 108 include video capture devices (e.g., video cameras), audio capture devices (e.g., microphones, voice recorders), presentation recorders, screen capture devices (e.g., a whiteboard information capture device), symbolic information capture devices, etc. In addition to capturing the information, capture devices 108 are able to capture temporal information associated with the captured information that may be used to synchronize the information with other captured information.

A presentation recorder is a device that is able to capture information presented during a presentation, for example, by tapping into and capturing streams of information from an information source. For example, if a computer executing a PowerPoint application is used to display slides from a *.ppt file, a presentation recorder may be configured to tap into the video output of the computer and capture keyframes every time a significant difference is detected between displayed video keyframes of the slides. The presentation recorder is also able to capture other types of information such as audio information, video information, slides information stream, whiteboard information, etc. The temporal information associated with the captured information indicating when the information was output or captured is then used to synchronize the different types of captured information. Examples of presentation recorders include a screen capture software application, a PowerPoint application that allows recording of slides and time elapsed for each slide during a presentation, and various others.

A symbolic information capture device is able to capture information stored in symbolic presentation documents that may be output during a presentation. For example, a symbolic information capture device is able to record slides presented at a presentation as a sequence of images (e.g., as JPEGs, BMPs, etc.). A symbolic information capture device may also be configured to extract the text content of the slides. For example, during a PowerPoint slide presentation, a symbolic information capture device may record the slides by capturing slide transitions (e.g., by capturing keyboard commands) and then extracting the presentation images based on these transitions. Whiteboard capture devices may include devices such as a camera appropriately positioned to capture contents of the whiteboard, a screen, a chart, etc.

The information captured by the various capture devices may be temporally synchronized. Time-based media information 104 may also be provided by other sources 110 such as radios, televisions, media players, CD or DVD players, video cassette recorders (VCRs), streaming information from a satellite signal, and the like.

Previously recorded time-based media information may be augmented by adding new information 112 to the recorded time-based media information. For example, a user may add annotations to previously recorded time-based media information. The annotations may be added at various points of time during the duration of the time-based media information. For example, the previously recorded time-based media information may comprise information recorded during a presentation using one or more capture devices 108. The recorded information may include audio information recorded during the presentation, video information recorded during the presentation, and slides information corresponding to slides presented during the presentation. The audio, video, and slides information may be stored as different channels of the time-based media information that are synchronized with each other. A user may at some later point in time review the recorded presentation information and add notes commenting on various portions of the presentation recording. The notes information added by the user may be stored as a separate channel of the time-based media information and temporally synchronized with the other channels of the time-based media information.

Data processing system 102 receives events criteria 116 representing information identifying one or more types of events that are to be identified from the time-based media information and included in static representation 106 generated for the time-based media information. An event may be related to some aspect of the contents of the time-based media information or related to some feature of the time-based media information. For example, for a recording of a presentation, events criteria 116 may specify a slides event implying that all instances of when a slide was first displayed during the presentation are to be shown in the static representation. As another example, for audio time-based media information, an event may be when a particular speaker speaks. Multiple events may be identified by events criteria 116. For example, in addition to slides, the event type identified by events criteria 116 may specify a notes event implying that all instances of notes added by a user to the time-based media information are to be identified and included in the static representation. Events criteria information 116 is user configurable.

Provision of event criteria 116 is not required by the present invention. Embodiments of the present inventions may also be configured to analyze the time-based media information to determine occurrences of certain events in the time-based media information. As described below in further detail, this processing may be automated using time-based media information processing programs or may even be performed manually.

Data processing system 102 may also receive information 114 that influences the manner in which a static representation is generated for time-based media information 104 and also influences the appearance of the static representation. Information 114 may include layout and style information that specifies the layout of the static representation and the styles to be used. The styles may be related to the format for depicting the timeline in the static representation, the fonts to be used, a maximum threshold number of events to be shown along the timeline, the color scheme to be used, and the like. A timeline may be made up of multiple sections (referred to as timeline sections), and the layout and style information may specify the number of timeline sections to be displayed on each page of the static representation, the maximum threshold number of events to be depicted for each timeline section, the time allocated to each timeline section, and the like.

According to the teachings of the present invention, static representation 106 may be printed on a paper medium. Accordingly, information 114 may also comprise print parameters identifying the manner in which the static representation is to be printed. The print parameters may identify the paper medium on which the static representation is to be printed, the size of the paper medium (e.g., A4 size paper, 8½ by 11 size paper), whether the static representation is to be printed in landscape or portrait format, the properties of a printer that is to be used for the printing, etc. The print parameters may affect the manner in which static representation 106 is generated. For example, the size of the paper may influence the number of timeline sections to be displayed on each page of the search engine and also influence the pagination of the static representation. The properties of the printer to be used for the printing may determine the appropriate level of resolution to be used for generating the static representation so that the generated static representation can be printed by the printer. Various other print parameters may also be provided.

Based upon time-based media information 104, event criteria 116, and information 114 (if specified), data processing system 102 is configured to generate a static representation 106 for time-based media information 104. As part of generating the static representation, data processing system is configured to process the time-based media information to determine one or more events occurring in the time-based media information that satisfy events criteria 116. The determination of events in time-based media information 104 may be automated using time-based media information processing programs or may be performed manually. For example, various content recognition techniques may be applied to the time-based media information to recognize occurrences of events in the time-based media information. The content recognition programs may be configured to receive events criteria 116 and determine events in the time-based media information that satisfy the events criteria. In absence of (or in addition to) events criteria 116, the content recognition programs may be configured to automatically detect events in the time-based media information. For example, events may be automatically determined upon detecting a particular face in the video information, detecting a particular speaker in the audio information, occurrences of certain words (word spotting) in the audio or video information, detecting loud noises in the audio information, detecting sudden movement in the video information, and the like.

Events in the time-based media information may also be manually detected. A person may review the time-based media information and identify occurrences of events in the time-based media information. For example, a person may hear audio information and identify events (e.g., topics of discussion, audio spoken by a particular speaker, etc.) in the audio information.

Information identifying the detected events (detected either automatically or manually) may be annotated to the time-based media information. For example, the events information may be stored as a separate channel of the time-based media information and temporally synchronized with the time-based media information. The events information may also be stored in other ways such that it is accessible during generation of the static representation.

For each determined event, data processing system 102 is configured to determine the time when the event occurs in the time-based media information. Data processing system then generates static representation 106 for the time-based media information. The appearance and layout of static representation 106 may be influenced by information 114.

According to an embodiment of the present invention, static representation 106 generated by data processing system 102 includes a timeline representing the duration of the time-based media information that is analyzed. In one embodiment, the entire time-based media information may be analyzed from the start time to the end time of the time-based media information and the timeline may represent the time duration from the start time to the end time. In another embodiment, a portion of the time-based media information may be analyzed from a first time to a second time, and the timeline in the static representation may represent the time duration from the first time to the second time.

For the events determined in the time-based media information, the static representation comprises indications provided along the timeline indicating when the determined events occur in the time-based media information. In one embodiment, for each event, the time that the event occurs in the time-based media information is translated to a location on the timeline approximately corresponding to that time. A mark is made on the timeline at that location for the event denoting occurrence of the event. Visual representations may also be generated for the events and included in the static representation. For example, for events representing showing of slides, a small image of the slide may be generated and included in the visual representation. Correlation information may be provided correlating the visual representation of an event to a mark on the timeline corresponding to occurrence of the event.

Static representation 106 may also include a tag for each event included in the static representation. In one embodiment, a tag for an event represents or encodes the time when the event occurs in the time-based media information. Tags associated with events enable access to the time-based media information.

Once static representation 106 has been generated, multiple actions may be performed on the static representation. The static representation may be output using an output device 117 such a monitor. Static representation 106 may also be sent to a printer 118 for printing. Printer 118 may print the static representation on a paper medium to generate a paper document comprising the static representation.

As previously indicated, tags may be included in the static representation. One or more tags printed on the paper document may be read by a reader device 122 to access the time-based media information or perform some action. In one embodiment, reading a tag using a reader device 122 invokes a media player 124 that starts playback of a portion of the time-based media information from a time corresponding to the read tag. In this manner, tags enable access to the time-based media information. In one embodiment, barcodes are used as tags and may be read by barcode readers. In alternative embodiment, tags may be in the form of numerical identifiers, and the user may type the numerals in a keypad or computer to enable access to the time-based media information. Tags may also be used to perform actions, as described below in further detail. Further details related to static representation 106 are provided below.

Figure 2:
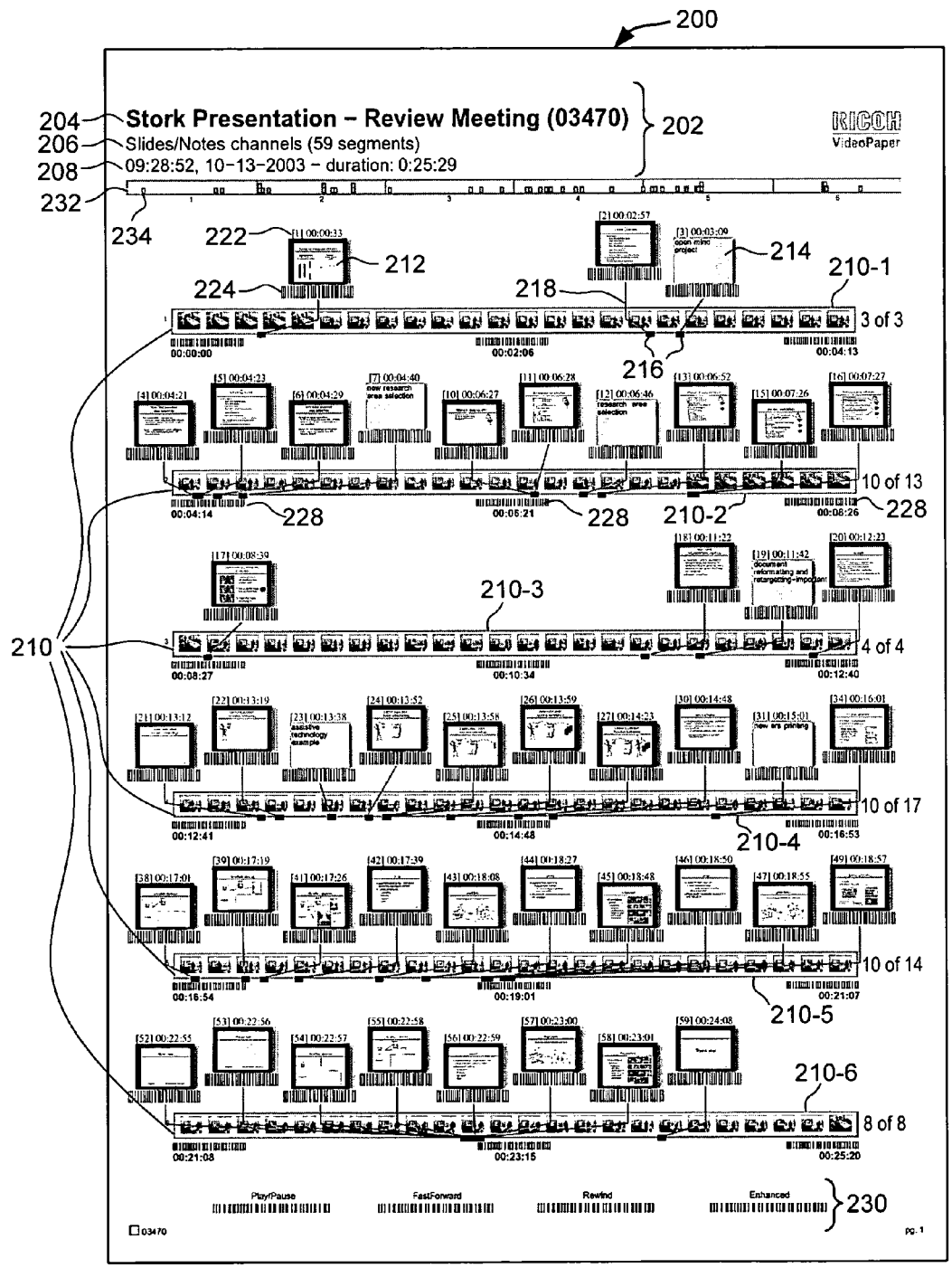
FIG. 2 is a simplified diagram of a static representation generated according to an embodiment of the present invention and printed on a paper medium.

FIG. 2 is a simplified diagram of a static representation generated according to an embodiment of the present invention and printed on a paper medium. Static representation 200 comprises information 202 related to the time-based media information for which static representation 200 has been generated. Information 202 may comprise an identifier or title 204 for the time-based media information. The static representation in FIG. 2 is generated for time-based media information recorded for a "Stork Presentation—Review Meeting". Information 206 identifying the events that are displayed in the static representation is also shown. In the example depicted in FIG. 2, the events consist of presentation slides shown during the presentation and notes taken during (or after) the presentation. The presentation slides information and the notes information may be stored as different channels of the time-based media information. Information 202 may also comprise information 208 identifying the time and date when the presentation was recorded and the duration of the recorded time-based media information. In the example depicted in FIG. 2, the time-based media information was recorded on Oct. 13, 2003 starting at 09:28:52 and has a duration of 25 minutes and 29 seconds.

A timeline 210 is displayed in static representation 200. In FIG. 2, timeline 210 is laid out from start to finish in a left to right and top to bottom format. The start of timeline 210 is the upper left corner and end of the timeline is at the lower right corner. In FIG. 2, timeline 210 represents the entire duration of the time-based media information (presentation recording), i.e., the start of the timeline 210 represents the start of the time-based media information and the end of timeline 210 represents the end of the time-based media information. In FIG. 2, the entire timeline is displayed on one page of the static representation. However, a timeline may extend across multiple pages of a static representation depending on the duration of the time-based media information represented by the timeline.

It should be apparent that a static representation need not be generated for the entire time-based media information. In alternative embodiments, a user may specify a first time marking the starting time for generation of the static representation and a second time marking the end time for the static representation. The first time may be different from the starting time of the time-based media information and the second time may be different from the end time of the time-based media information. Accordingly, a static representation may be generated for any segment of time of the time-based media information. In embodiments where a first time and a second time have been specified, the start of the timeline corresponds to the first time and the end of the timeline corresponds to the second time and the timeline represents a segment of time of the time-based media information between the second time and the first time.

In the example depicted in FIG. 2, timeline 210 comprises six timeline sections 210-1, 210-2, 210-3, 210-4, 210-5, and 210-6. Each timeline section (or sub-timeline) corresponds to a portion of time of the total time represented by the timeline. In FIG. 2, the duration of time represented by each timeline section is the same, namely, 04:13 minutes. Accordingly, timeline section 210-1 represents the first 04:13 minutes of the time-based media information, timeline section 210-2 represents the second 04:13 minutes of the time-based media information, timeline section 210-3 represents the next 04:13 minutes of the time-based media information, and so on, and timeline section 210-6 represents the last 04:13 minutes of the time-based media information. The duration of each timeline section may be user configurable or may be set automatically by the application responsible for generating the static representation.

Figure 3:
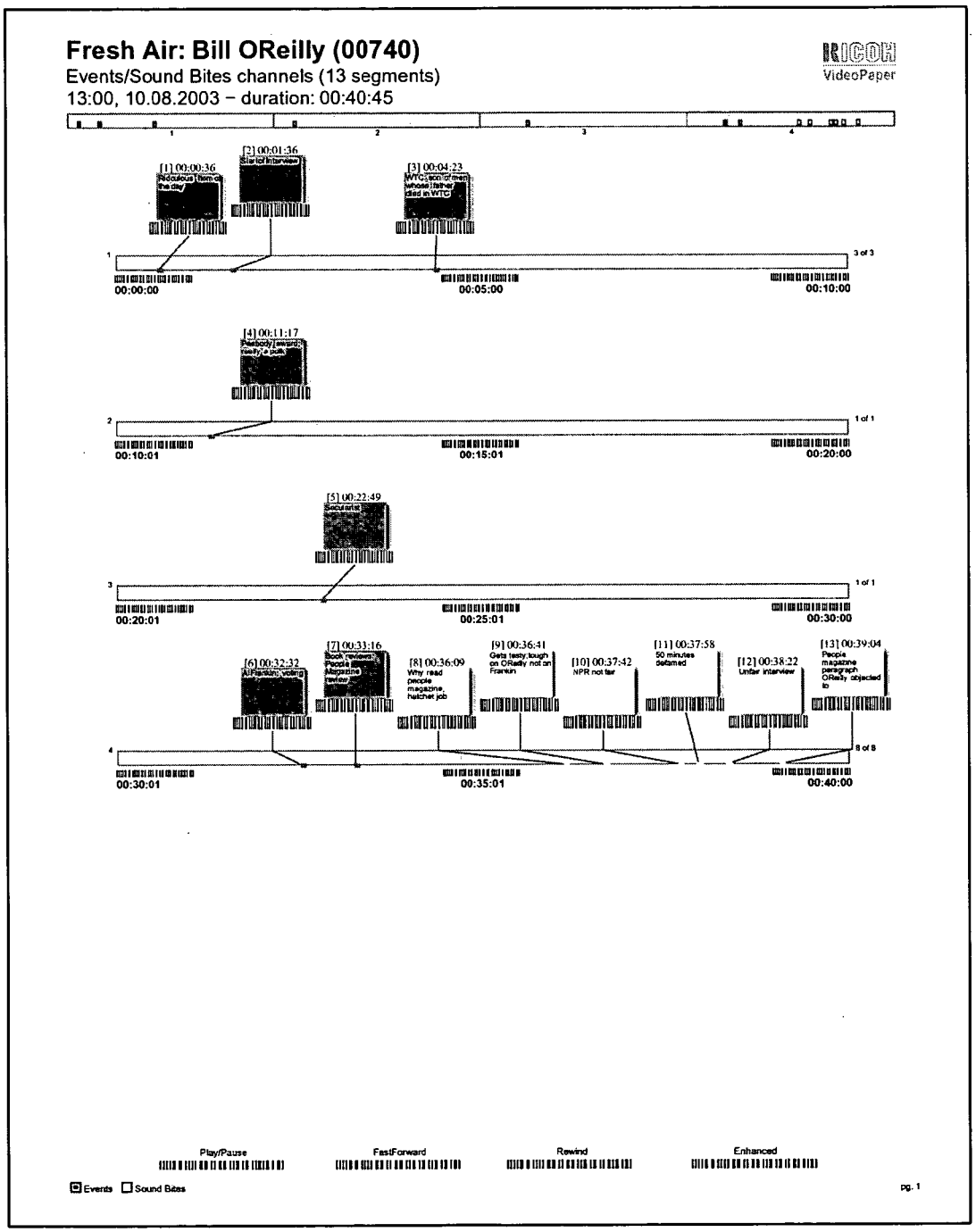
FIG. 3 depicts a static representation generated for a radio broadcast according to an embodiment of the present invention.

Various different styles may be used for depicting a timeline. The styles may be user configurable. In the example depicted in FIG. 2, timeline 210 comprises keyframes extracted from the video stream portion of the time-based media information. The keyframes provide a visual context for the displayed information. In alternative embodiments, if the keyframes cannot be extracted from the time-based media information, then the timeline may be shown as a line or box without any images, as shown in FIG. 3.

Events determined from the time-based media information are mapped to timeline 210 in FIG. 2. In the example in FIG. 2, the events that are depicted comprise slides events (i.e., showing of slides during the presentation) and notes events (notes taken during or after the presentation). The notes may have been recorded during the presentation or may have been added by a user after the presentation and synchronized with the other channels of information of the time-based media information.

The events may be represented using different ways. In one embodiment, a visual representation is used to depict each event. For example, in FIG. 2, visual representations are generated for slide events. The visual representation 212 for a slides event comprises a small image of the slide that was displayed. The visual representation 214 for a note comprises a text image of the note. Various different visual representations may be used for different events. Different techniques may be used to differentiate between the different types of events. According to one technique, different colors may be used for the visual representations of the events to differentiate between the events. For example, in FIG. 2, a first color may be used for the visual representations of slide events and a second color that is different from the first color may be used for the visual representations of the notes.

For each event, information is displayed along timeline 210 indicating a point along the timeline corresponding approximately to the time when the event occurs in the time-based media information. In FIG. 2, the point on timeline 210 for each event is indicated by a mark 216. Accordingly, for each event, the time that the event occurs in the time-based media information is translated to a mark or location on the timeline approximately corresponding to that time. For example, in FIG. 2, each mark 216 on timeline 210 for a slide event denotes the approximate time in the time-based media information when the slide was displayed during the presentation. For each event, information is also printed correlating the mark on timeline corresponding to the occurrence of the event in the time-based media information. In FIG. 2, the correlation information is a line or arrow 218 from the mark along the timeline towards the visual representation of the event.

For example, in FIG. 2, three events (2 slides, 1 note) are plotted along timeline section 210-1, ten events (8 slides, 2 notes) are plotted along timeline section 210-2, four events (3 slides, 1 note) are plotted along timeline section 210-3, ten events (8 slides, 2 notes) are plotted along timeline section 210-4, ten events (10 slides) are plotted along timeline section 210-5, and eight events (8 slides) are plotted along timeline section 210-6. For each event, a mark 216 is indicated on timeline 210 representing the time when the event occurred in the time-based media information.

The static representation also includes a tag 224 associated with each event. In FIG. 2, each tag 224 is a barcode. In one embodiment, each tag 224 for an event represents or encodes the time when the event occurs in the time-based media information. In FIG. 2, the time corresponding to a tag for an event (i.e., the approximate time when the event occurs in the time-based media information) is also printed (reference 222) on top of the visual representation of the event.

Tags 224 associated with events enable access to the time-based media information. In one embodiment, a user may select a tag associated with an event and access time-based media information related to that event from the time represented by the selected tag. For example, in FIG. 2, selecting a tag associated with a slides event invokes an application (e.g., a media player) that outputs the slides information for the selected slides event and also starts playback of the video (and audio or other information if available) information from the time corresponding to the selected tag (i.e., from a time when that event occurs in the time-based media information).

The static representation depicted in FIG. 2 also comprises tags 228 associated with each timeline section. As shown, three tags are printed along the bottom of each timeline section corresponding to the start time of the time segment represented by the timeline section, a middle time point of the time segment represented by the timeline section, and an end time of the time segment represent by the timeline section. A user may select any of these tags to initiate playback of information from the time corresponding to the selected tag. In FIG. 2, the time represented by each tag associated with a timeline section is also printed below the tag.

A set of tags 230 is printed for controlling playback of the output information. For example, tags 230 may be selected to play/pause the playback, fast forward the playback, perform rewind operations, or perform other user configurable operations on the time-based media information that is output. Tags for performing other types of actions may also be included in the static representation in alternative embodiments. For example, tags may be included for performing actions such as sending an email, sending a fax, saving a document (e.g., the time-based media information or potion thereof), printing a document, etc.

Tags 224, 228, and 230 displayed in FIG. 2 are barcodes. However, in alternative embodiments, other kinds of tags and mechanisms that enable facilitate access to the time-based media information may also be used.

The static representation depicted in FIG. 2 also includes a global timeline 232. Global timeline 232 provides a summary of the entire timeline 210 and its timeline sections. Global timeline 232 is especially useful when timeline 210 comprises several timeline sections and may be spread across multiple pages. Global timeline 232 provides an overall context for the static representation by showing all the timeline sections in one place. For example, in FIG. 2, the static representation for the time-based media information is printed on a single page and the timeline comprises of six timeline sections. Accordingly, global timeline 232 comprises six parts corresponding to the six timeline sections, each part representing an individual timeline section. Each part of global timeline 232 is identified by a numbers printed below the part. The number is also printed next to the timeline section corresponding to the part. If timeline 210 were printed across several pages (i.e., comprises several timeline sections printed across multiple pages), then global timeline 232 would show the entire timeline and contain a part for each individual timeline section. In this manner, global timeline 232 provides a context for the entire static representation. Global timeline 232 may be printed on each page of the static representation when printed on paper.

Global timeline 232 also indicates the occurrences of events. Events that are mapped to the individual timeline sections are shown in global timeline 232 in the part of the global timeline corresponding to the individual timeline sections. For example, in FIG. 2, the occurrences of events that are mapped to timeline 210 are also shown in global timeline 232 using small boxes 234. The boxes may be of different colors to denote the different types of events. The boxes are printed along global timeline 232 at the approximate location each event occurs in the time-based media information and has been mapped to timeline 210. Global timeline 232 thus provides an overall context for the static representation document.

The static representation depicted in FIG. 2 and printed on a paper medium provides a time-oriented representation of time-based media information and provides an overview of events that occur in the time-based media information. For each event, the static representation displays information indicating the type of the event. The timeline and marks along the timeline provide an approximate temporal location in the time-based media information when the events occur (or alternatively does not occur). Further, the static representation enables access to the time-based media information. One or more tags printed on the paper medium may be selected to access time-based media information corresponding to the selected tags. In this manner, the paper document on which the static representation is printed provides a paper-based interface for accessing time-based media information. Tags may also be selected for performing other actions.

As depicted in FIG. 2, the events are horizontally plotted to each timeline section. The visual representations of the events are also vertically staggered to prevent the barcodes (tags) associated with the events from aligning or overlapping with each other which may cause errors when scanning using a reader device such as a barcode scanner. Since the static representation is generated such that it can be printed on a paper sheet, the horizontal width of the static representation is limited to that of the paper. As a result, the space available for plotting the events along a timeline section is limited. There are only a limited number of positions along the timeline to place the visual representation of the events. For example, when using 8"×11" paper in portrait mode such as depicted in FIG. 2, there is space only for depicting up to ten visual representations of events for a timeline section given the current size of the event visual representation and the barcode (tag) associated with each event.

In some cases the tight clustering of multiple events along a timeline section can be reduced by decreasing the time allotted to each timeline section, thereby increasing the spacing between the events. The time allocated for each timeline section may be automatically determined by the static representation generation application or may be specified by a user.

In many instances however, it is not always possible to decrease the time allocated to each timeline section to reduce the tight clustering of events. Accordingly, techniques (referred to as "placement techniques") are provided for determining which events to show, how many events to show per timeline section, and where to position them to optimize the layout. The maximum threshold number of events (or visual representations of the events) to be shown for each timeline section may be automatically determined by the static representation generation application based upon the size of the visual representations of the events, size of tags associated with the events, size of the timeline sections, and other like factors. Alternatively, the maximum threshold number of events (or visual representations of the events) to be shown for each timeline section may be set by a user.

For example, in FIG. 2, 17 events were determined corresponding to the time (events between the times 00:12:41-00:16:54) depicted by timeline section 210-4, but only 10 events are shown in the static representation. For each timeline section, information identifying the total number of events determined for the timeline section and the number of events selected for inclusion in the static representation is shown at the right hand side of each timeline section (e.g., 10 of 17 for timeline section 210-4). Given a maximum threshold of 10 events per timeline section, the placement technique selected only 10 events to be included in the static representation fro timeline section 210-2.

The placement technique also handles placement of visual representations of the events when the events occur along a timeline section are closely bunched together. For example, for timeline section 210-6 depicted in FIG. 2, seven slides events all co-occur in close proximity to each other with respect to time and are closely marked together on timeline section 210-6. This may be due to several reasons such as a presenter either quickly flipping through a slide collection or using animation. In this example, eight different slides are presented in a very short time. The placement technique figures out the optimal way to organize the events such that the resultant static representation is easily readable. In one embodiment, this is done by centering the visual representation corresponding to the "middle" event (e.g., event 00:22:59) over the general timeline location. The remaining events (or visual representations of the events) are then added, by time, from left to right.

Lines or arrows (or some other information correlating the visual representations of the events to the marks along the timeline) are then drawn from the visual representations of the events to the approximate location on the timeline corresponding to the times when the events occurred in the time-based media information. The lines show where an event has occurred along the timeline. The static representation also shows what other events have occurred in close proximity to this event and provides a context for the event. Because the points on the timeline are tightly clustered, it may be assumed that the presenter was flipping through this collection of slides until the eighth slide was reached which may have been accompanied with an explanation. In a similar manner, for timeline section 210-3 depicted in FIG. 2, a reader of the static representation might assume several things about the slide shown on the left side of this timeline section. The first event shown on timeline section 210-3 is somewhat isolated with respect to all other events on the page. This may indicate that the presenter spent a lot of time explaining this slide or that the presentation of the slide caused some discussion which interrupted the presentation for a short period of time. Accordingly, a user may derive a lot of contextual information from the static representation and the placement of events along the timeline in the static representation.

The static representation depicted in FIG. 2 is generated for time-based media information that comprises at least video information, slides information, and notes information, in addition to potentially other types of information. Static representations may be generated for other types of time-based media information. For example, static representations may be generated for media streams that have no video images or text. For example, a static representation may be generated for time-based media information that comprises only audio content such as a radio broadcast recording, audio recorded by an audio recorder or dictation device, etc. The timeline representation accommodates such audio content.

There are various ways in which events may be determined from or annotated to audio content. The audio content may be processed to identify categories of events by speaker, by topic, etc. The events may be related to audio spoken by a particular speaker, discussions related to a particular topic, specific portions of audio of interest to a user, etc. The processing may be performed manually or using automated programs (e.g., content recognition programs that are able to recognize the context and content of the audio information). The events information may then be annotated to the audio. For example, a separate channel with event annotations may be added to the time-based media audio information and temporally synchronized with the audio information. In this manner events may be determined for audio information.

In other embodiments, a transcription of the audio content may be obtained to facilitate determination of events in the audio information. Based upon the transcription, events may be annotated to the audio information. For example, occurrences of certain words in the audio transcription may signal the occurrence of an event. Since the audio-to-text transcription techniques may not always be accurate, a threshold may be configured identifying that a certain threshold number have to be present before an event based upon the words is identified. Alternatively, events may be identified based upon confidence scores associated with the transcribed text. The events information may be stored as a separate channel along with the audio content and synchronized with the audio content. The events information associated with the audio information may then be used to identify events to be included in the static representation for the audio information.

A static representation comprising a timeline and events plotted along the timeline may be generated for audio information. Examples of events that may be determined for audio information include speaker detection and recognition, laughing or yelling etc., when a particular topic is discussed (content recognition), periods of silence, etc. FIG. 3 depicts a static representation generated for a radio broadcast (audio information) according to an embodiment of the present invention. Two types of events are displayed in the static representation, namely, events representing topics of discussion (indicated by visual representation with a dark background) and events representing sound bites (indicated by visual representation with a light background). Different colors may be used to differentiate between the two types of events. The static representation depicted in FIG. 3 may be printed on a paper medium. The generated paper document may then be used to access portions of the radio broadcast related to one or more events. The paper document thus provides a structure that allows a user to navigate and randomly access portions of the audio content of the radio broadcast. The paper document comprising the static representation thus provides a visual tool for navigating the underlying audio media content.

Figure 4:
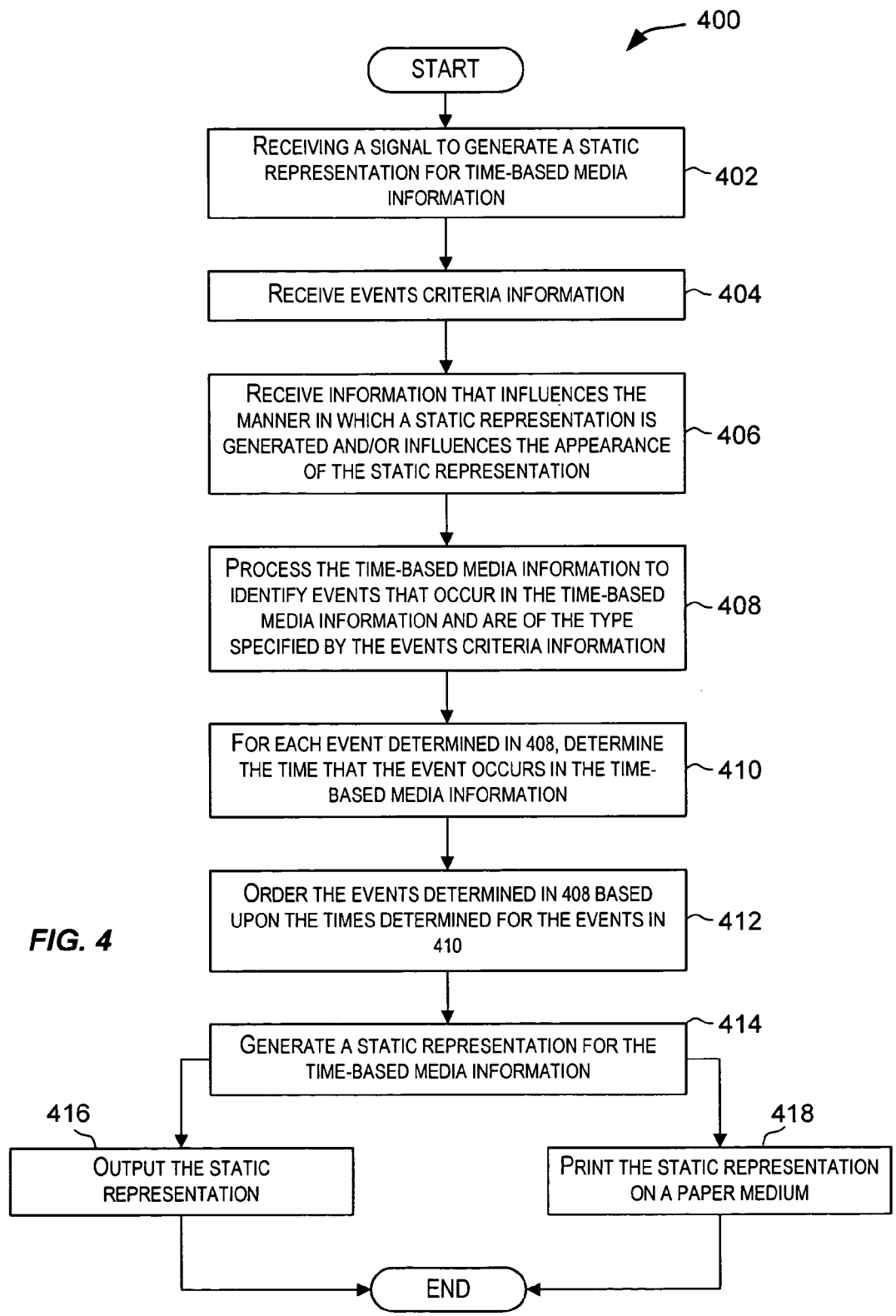
FIG. 4 is a simplified high-level flowchart depicting a method of generating and printing a static representation according to an embodiment of the present invention.

FIG. 4 is a simplified high-level flowchart 400 depicting a method of generating and printing a static representation according to an embodiment of the present invention. The method depicted in FIG. 4 may be performed by software code modules or instructions executed by a processor, hardware modules, or combinations thereof. Flowchart 400 depicted in FIG. 4 is merely illustrative of an embodiment of the present invention and is not intended to limit the scope of the present invention. Other variations, modifications, and alternatives are also within the scope of the present invention. The method depicted in FIG. 4 may be adapted to work with different implementation constraints.

As depicted in FIG. 4, processing is initiated upon receiving a signal to generate a static representation for time-based media information (step 402). The signal may indicate that the static representation is to be generated for the entire time-based media information (i.e., from the start time of the time-based media information to the end time of the time-based media information). Alternatively, information may be received specifying that the static representation is to be generated for a portion of the time-based media information between a first time and a second time. Information specifying the location of the time-based media information may also be received in 402.

Events criteria information may be received (step 404). The events criteria information specifies the one or more types of events that are to be identified in the static representation. Events criteria information may be provided by a user. As previously described, event criteria information is not required for the present invention. Events may also be automatically determined from the time-based media information for which a static representation is to be generated.

Information that influences the manner in which a static representation is generated and/or influences the appearance of the static representation may be received (step 406). The information received in 406 may include layout and style information that specifies the layout of the static representation and the styles to be used. The layout and styles may include information related to the format for depicting the timeline in the static representation, the fonts to be used, a maximum threshold number of events to be shown along the timeline, the color scheme to be used, the number of timeline sections to be displayed on each page of the static representation, the time duration represented by each timeline section, the maximum threshold number of events to be depicted for each timeline section, and the like. The information received in 406 may comprise print parameters identifying the manner in which the static representation is to be printed. The print parameters may identify the paper medium on which the static representation is to be printed, the size of the paper medium (e.g., A4 size paper, 8½ by 11 size paper), whether the static representation is to be printed in landscape or portrait format, the properties of the printer that is to be used for the printing, etc.

Although steps 402, 404, and 406 are shown as being performed sequentially in FIG. 4, the steps may be performed in any order or even in a single step.

The time-based media information is then processed to identify events that occur in the time-based media information and are of the type specified by the events criteria information (step 408). The processing may be performed for the entire time-based media information or for a portion of the time-based media information as indicated by the first and second times received in 402. As previously indicated, the time-based media information may comprise information of different types. The processing may be performed on one or more type of information included in the time-based media information. Different techniques may be used to process the different types of information to determine events occurring in that type of information.

In one embodiment, the occurrences of events may be indicated in the time-based media information itself. For example, the occurrence of a slide (or note) in the time-based media information indicates occurrence of a slide (or notes) event. The channels of the time-based media information may thus indicate when an event occurs. Other types of techniques may be used for processing other types of information.

The time-based media information may also be processed to determine occurrences of one or more events in the time-based media information that satisfy the events criteria if provided. Various time-based media information processing programs may be used for the detection of events. The content recognition programs may be configured to receive the events criteria and determine events in the time-based media information that satisfy the events criteria. In absence of (or in addition to) events criteria, the content recognition programs may be configured to automatically detect events in the time-based media information. For example, events may be automatically determined upon detecting a particular face in the video information, detecting a particular speaker in the audio information, occurrences of certain words (word spotting) in the audio or video information, detecting loud noises in the audio information, detecting sudden movement in the video information, and the like.

Events in the time-based media information may also be manually detected. A person may review the time-based media information and identify occurrences of events in the time-based media information. For example, a person may hear audio information and identify events (e.g., topics of discussion, audio spoken by a particular speaker, etc.) in the audio information.

Information identifying the detected events (detected either automatically or manually) may be annotated to the time-based media information. For example, the events information may be stored as a separate channel of the time-based media information and temporally synchronized with the time-based media information. The events information may also be stored in other ways such that it is accessible during generation of the static representation.

For each event determined in 408, the time that the event occurs in the time-based media information is also determined (step 410). The events determined in 408 may then be ordered based upon the times determined for the events in 410 (step 412).

A static representation is then generated for the time-based media information (step 414). The static representation generated in 414 may have some or all the features of a static representation described above. For example, the static representation may comprise a timeline with events determined in 408 mapped to various locations of the timeline depending upon the times determined for the events in 410. The static representation may also comprise tags for the events that enable access to the time-based media information.

Various actions may then be performed on the static representation generated in 414. As shown in FIG. 4, the static representation may be output to a user via a display device (step 416) or may be printed on a paper medium (step 418) to generate a paper document on which the static representation is printed.

Figure 5:
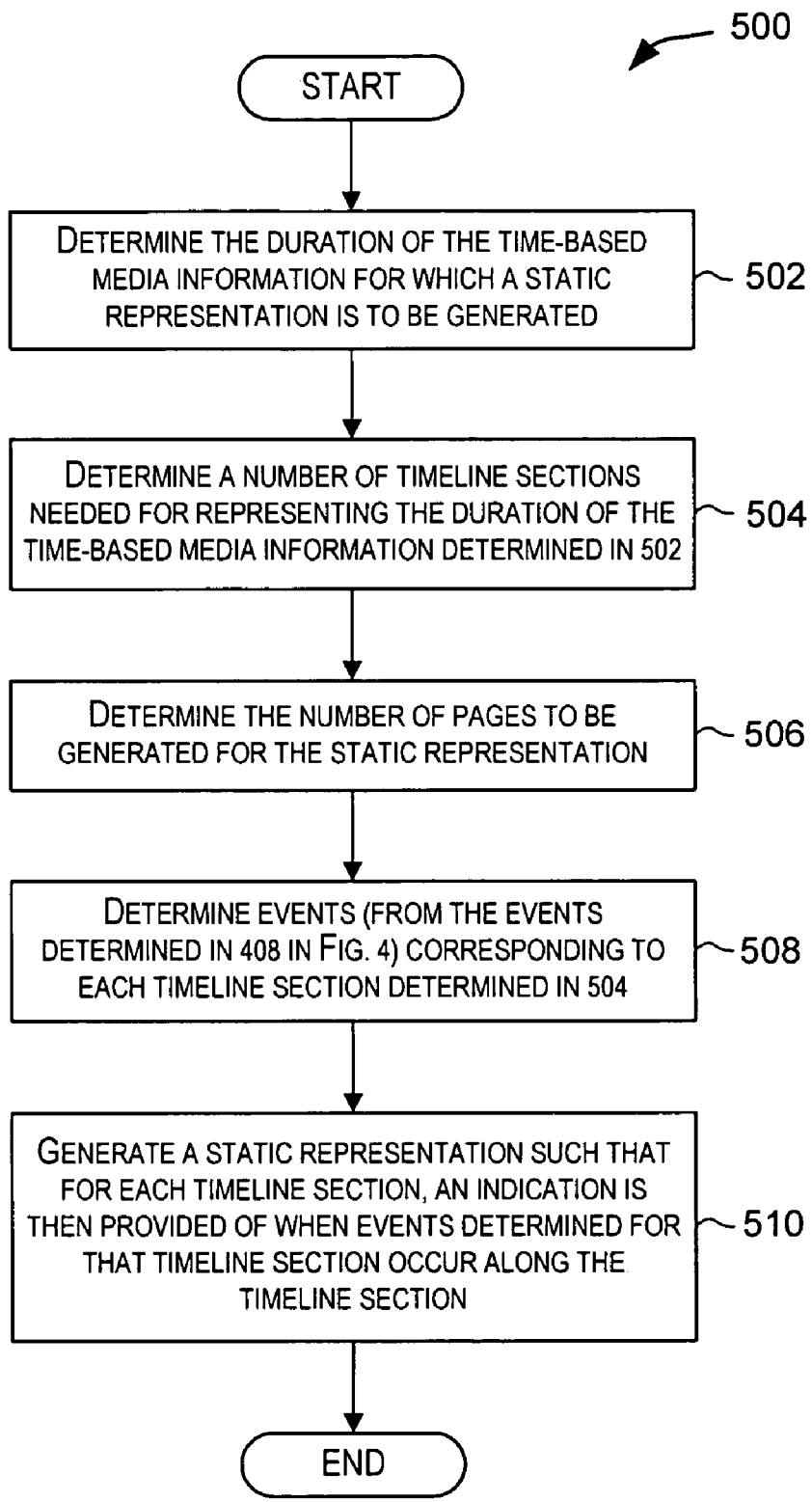
FIG. 5 is a simplified high-level flowchart depicting a method of generating a static representation according to an embodiment of the present invention.

FIG. 5 is a simplified high-level flowchart 500 depicting a method of generating a static representation according to an embodiment of the present invention. The method depicted in FIG. 5 may be performed by software code modules or instructions executed by a processor, hardware modules, or combinations thereof. Flowchart 500 depicted in FIG. 5 is merely illustrative of an embodiment of the present invention and is not intended to limit the scope of the present invention. Other variations, modifications, and alternatives are also within the scope of the present invention. The method depicted in FIG. 5 may be adapted to work with different implementation constraints. The processing depicted in FIG. 5 may be performed as part of step 414 depicted in FIG. 4.

The duration of the time-based media information for which the static representation is to be generated is determined (step 502). As previously indicated, the duration may be the entire duration of the time-based media information from the start to the end or may be between a first time and a second time specified by a user.

Based upon the duration of the time-based media information, a number of timeline sections needed for representing the duration are then determined (step 504). The number of timeline sections depends on the duration or segment of time allocated to each timeline section. As previously indicated, the amount of time for each section may be user-configurable. For example, the duration of time represented by each timeline section may be specified by the layout and style information. In other embodiments, the time for each timeline section may be automatically determined. Factors such as the size of the paper on which the static representation is to be printed, the amount of clustering of events, etc. may influence the time allocated to each timeline sections.

The number of pages to be generated for the static representation is then determined (step 506). The number of pages depends on the number of timeline sections determined in 504 and the number of timeline sections to be included on a page. Information specifying the number of timeline sections to be included on each page may be user-configurable and may be included in the layout and styles information. In other embodiments, the number of timeline sections to be printed on a page may be automatically determined.

The processing depicted in step 506 need not be performed in certain embodiments of the present invention. For example, step 506 may not be performed in embodiments where the printing application (or some other application) is capable of performing the pagination function. In these embodiments, the pagination related functions may be performed by the printing application itself.

Events (from the events identified in 408 in FIG. 4) corresponding to each timeline section determined in 504 are then determined (step 508). An event is selected for a timeline section if the event occurs during the time segment corresponding to the timeline section. Zero or more timeline events may be determined for each timeline section.

A static representation is then generated such that for each timeline section, an indication is provided of when events determined for that timeline section occur along the timeline section (step 510). As part of 510, for each event determined for a timeline section, a location is determined on the timeline section when that event occurs in the time-based media information. A mark (reference 216 as depicted in FIGS. 2 and 3) may be made on the timeline section for each event to denote the occurrence of the event.

There are different ways in which events may be represented in the static representation. In one embodiment, as part of 510, a visual representation is generated for each event. Different types of visual representations may be generated for different types of events. For example, as shown in FIG. 2, an image of a slide may be generated for each slides event, text may be used to represent notes, etc. The visual representations generated for events determined for a timeline section are positioned along the timeline section in the static representation. Correlation information is provided for each event correlating the visual representation generated for the event to the mark on the timeline section identifying when the event occurs along the timeline section. The correlation information may be a line or arrow correlating the visual representation to the mark along the timeline section. Other types of correlation information may also be provided.

Tags may also be generated for each event corresponding to the time when the event occurs in the time-based media information and included in the static representation. For each event the tag generated for the event may be placed in a location proximal to the visual representation for the image. As depicted in FIG. 2, tags are placed below the visual representations of the events. Tags may also be generated for each timeline section. For example, in one embodiment (as depicted in FIG. 2), three tags 228 are generated for each timeline section corresponding to a start time for the timeline section, a middle time, and an end time of the time segment represented by the timeline section.

The contents of the static representation are arranged to enhance readability of the static representation. For example, as depicted in FIG. 2, events are horizontally plotted to each timeline section and the visual representations of the events are also vertically staggered to prevent the barcodes (tags) associated with the events from aligning or overlapping with each other which may cause errors when scanning using a reader device such as a barcode scanner. Since the static representation is generated such that it can be printed on a paper sheet, the horizontal width of the static representation is limited. As a result, there are only a limited number of positions along the timeline to place the visual representation of the events. Accordingly, as previously described, placement techniques are provided for determining which events to show, how many events to show per timeline section, and where to position them along the timeline section to optimize the layout and readability of the static representation.

Figure 6:
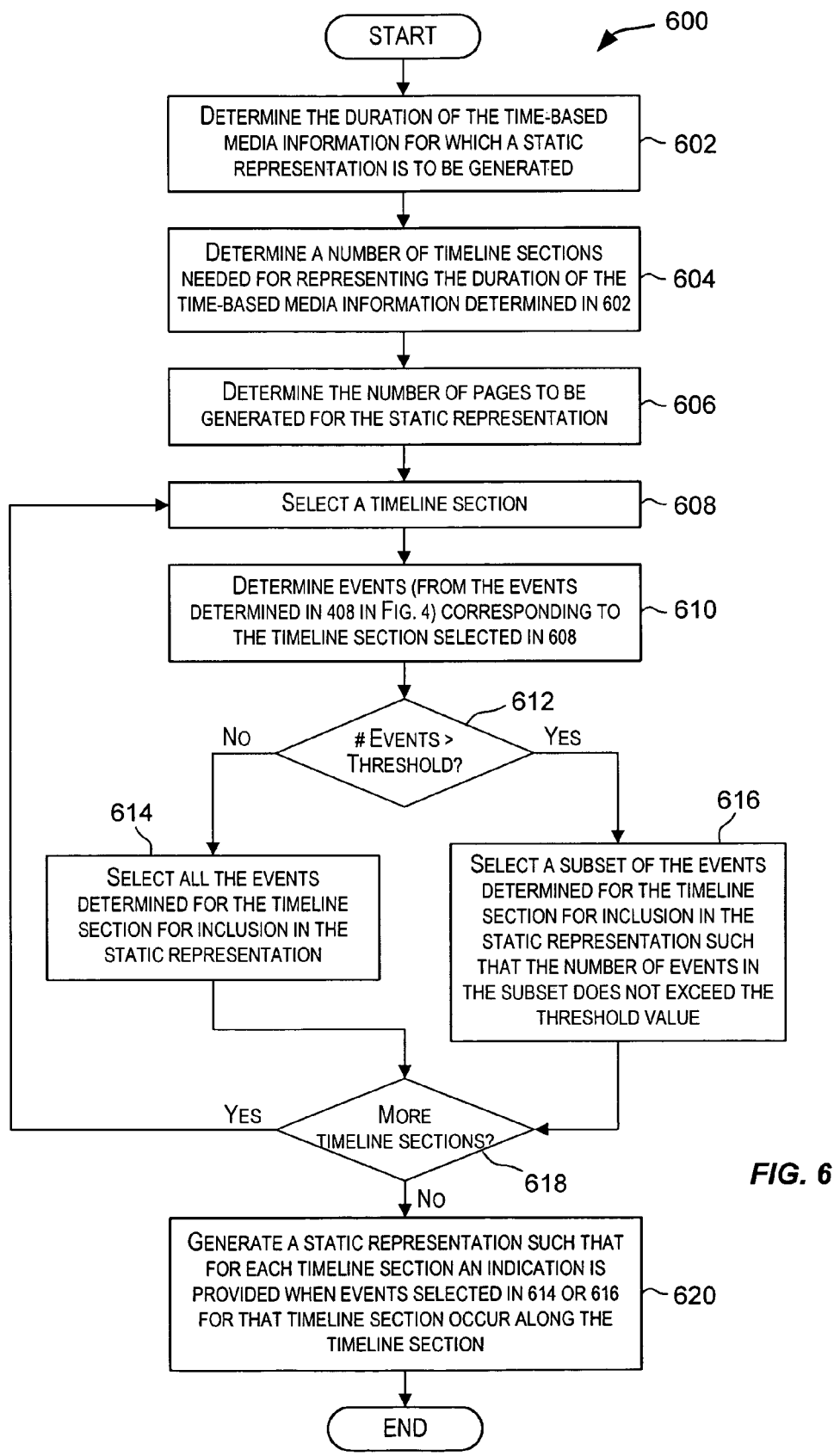
FIG. 6 is a simplified high-level flowchart depicting a method of generating a static representation using a placement technique according to an embodiment of the present invention.

FIG. 6 is a simplified high-level flowchart 600 depicting a method of generating a static representation using a placement technique according to an embodiment of the present invention. The method depicted in FIG. 6 may be performed by software code modules or instructions executed by a processor, hardware modules, or combinations thereof. Flowchart 600 depicted in FIG. 6 is merely illustrative of an embodiment of the present invention and is not intended to limit the scope of the present invention. Other variations, modifications, and alternatives are also within the scope of the present invention. The method depicted in FIG. 6 may be adapted to work with different implementation constraints. The processing depicted in FIG. 6 may be performed as part of step 414 depicted in FIG. 4.

Steps 602, 604, and 606 are similar to steps 502, 504, and 506 depicted in FIG. 5 and described above. A timeline section from the timeline sections determined in 604 is then selected for processing (step 608). Events (from the events determined in 408 in FIG. 4) corresponding to the selected timeline section are then determined (step 610). An event is determined for the selected timeline section if the event occurs during a time segment represented by the selected timeline section.

A check is then made to see if the number of events selected for the timeline section exceeds a pre-configured threshold value (step 612). The pre-configured threshold value specifies the maximum number of events (or visual representations of the events) to be shown for each timeline section. The threshold may also be automatically determined by the static representation generation application based upon the size of the visual representations of the events and the tags associated with the events. Alternatively, the threshold value may be user configurable.

If it is determined in 612, that that threshold value is not exceeded, then all the events determined for the timeline section are selected to be included in the static representation (step 614).

If it is determined in 612, that the threshold value is exceeded, then a subset of the events determined for the timeline section are selected to be included in the static representation such that the number of events in the subset does not exceed the threshold value (step 616). Various different techniques may be used to determine which events to select. In one embodiment, the events determined for a timeline section may be prioritized and events with higher priorities may be selected. According to another technique, the events may be compared to each other to determine which ones to select for inclusion in the static representation.

According to one events selection technique, the determined events are first ranked based on their type and a score is generated for each event. For example, a notes event relating to a note taken during a meeting may rank higher than a slides event corresponding to a slide shown during the meeting. For example, a notes event may receive a score of 0.3 while a slides event may receive a score of 0.1. This may be done because notes are typically more relevant than slides because they are human generated. Also, events such as whiteboard or photos taken during a meeting may rank higher than a slide (e.g., be assigned a score of 0.2). Events which co-occur in close proximity to each other may be "penalized" based on the logic that one event from a particular time period is better than multiple events which could potentially show the same content. So, for instance, if the event being evaluated co-occurs within, say 3 seconds, of another event, that event may be penalized by reducing its score by 0.1. Events may also be "rewarded" by increasing their scores. For instance, an event with a long duration (e.g., more than 10 seconds may be rewarded), an event with lots of text (notes) may be rewarded, and the like. The events are then sorted based upon their scores. From the sorted list of events, the top "X" number of events is selected, where "X" is the maximum threshold number of events that can be displayed along a timeline section. The selected events are then resorted based upon times associated with the events. The events are then depicted along the timeline section based on the resorted event order. Locations along the timeline section corresponding to the times when the events selected occur are marked. Correlation information (e.g., a line, arrow, etc.) is then provided for each selected event correlating the event and a mark along the timeline section corresponding to the event.

A check is then made to see if there are more unprocessed timeline sections (step 618). If more unprocessed timeline sections exist, then an unprocessed timeline section is selected in step 608 and processing continues with step 610. If all timeline sections have been processed, then processing continues with step 620.

A static representation is then generated such that for each timeline section an indication is provided when events selected in 614 or 616 for that timeline section occur along the timeline section (step 620). For each event selected for a timeline section, a location is determined on the timeline section when that event occurs in the time-based media information. A mark (reference 216 as depicted in FIGS. 2 and 3) may be made on the timeline section for each event to denote the occurrence of the event. Visual representations may be generated for the events selected in 614 or 616 and included in the static representation. Correlation information may be provided for each selected event correlating the visual representation generated for the event to the mark on the timeline section identifying when the event occurs along the timeline section. Tags may also be generated for each selected event corresponding to the time when the selected event occurs in the time-based media information and included in the static representation.

The static representation may also comprise information identifying the number of events that were determined for each timeline sections and the number of events that were eventually selected for inclusion in the static representation. For example, as depicted in FIG. 2, for timeline section 210-2 thirteen events were determined for the timeline section but only ten (10 of 13) were selected for inclusion in the static representation. On the other hand, for timeline section 210-1 three events were determined for the timeline section and all three (3 of 3) were selected for inclusion in the static representation.

According to an embodiment of the present invention, the placement technique that is used to determine which events to select for inclusion in the static representation is also configured to determine the locations of the visual representations of the events along the timeline sections. This is especially useful when the events occur along a timeline and are closely bunched together. For example, for timeline section 210-6 depicted in FIG. 2, seven slides events all co-occur in close proximity to each other with respect to time and are closely marked together on timeline section 210-6. The placement technique figures out the optimal way to organize the events such that the resultant static representation is easily readable. In one embodiment, this is done by centering the visual representation corresponding to the "middle" event (e.g., event 00:22:59) over the general timeline location. The remaining events (or visual representations of the events) are then added, by time, from left to right.

As described above, different kinds of tags may be included in the visual representation. For example, tags may be included in the static representation for each event included in the static representation. Each tag for an event may represent or encode the time when the event occurs in the time-based media information. Tags associated with events enable access to the time-based media information. Tags may also be associated with a timeline or sections of a timeline. For example, as depicted in FIG. 2, tags 228 associated with each timeline section correspond to the start time of the time segment represented by the timeline section, a middle time point of the time segment represented by the timeline section, and an end time of the time segment represent by the timeline section. A user may select any of these tags to initiate playback of information from the time corresponding to the selected tag. Tags may also be printed for (e.g., tags 230 depicted in FIG. 2) for controlling playback of the output information. For example, tags 230 may be selected to play/pause the playback, fast forward the playback, perform rewind operations, or perform other user configurable operations on the time-based media information that is output. Tags 230 may also include tags for performing other types of actions. For example, tags may be included for performing actions such as sending an email, sending a fax, saving a document (e.g., the time-based media information or potion thereof), printing a document, etc.

The tags may be read using a reading device from a paper document on which the static representation is printed to initiate playback of the time-based media information or to initiate performance of an action corresponding to the tag. In the embodiments depicted in FIGS. 2 and 3, the tags are in the form of barcodes that may be read by a barcode reader. Other types of tags may also be used.

Figure 7:
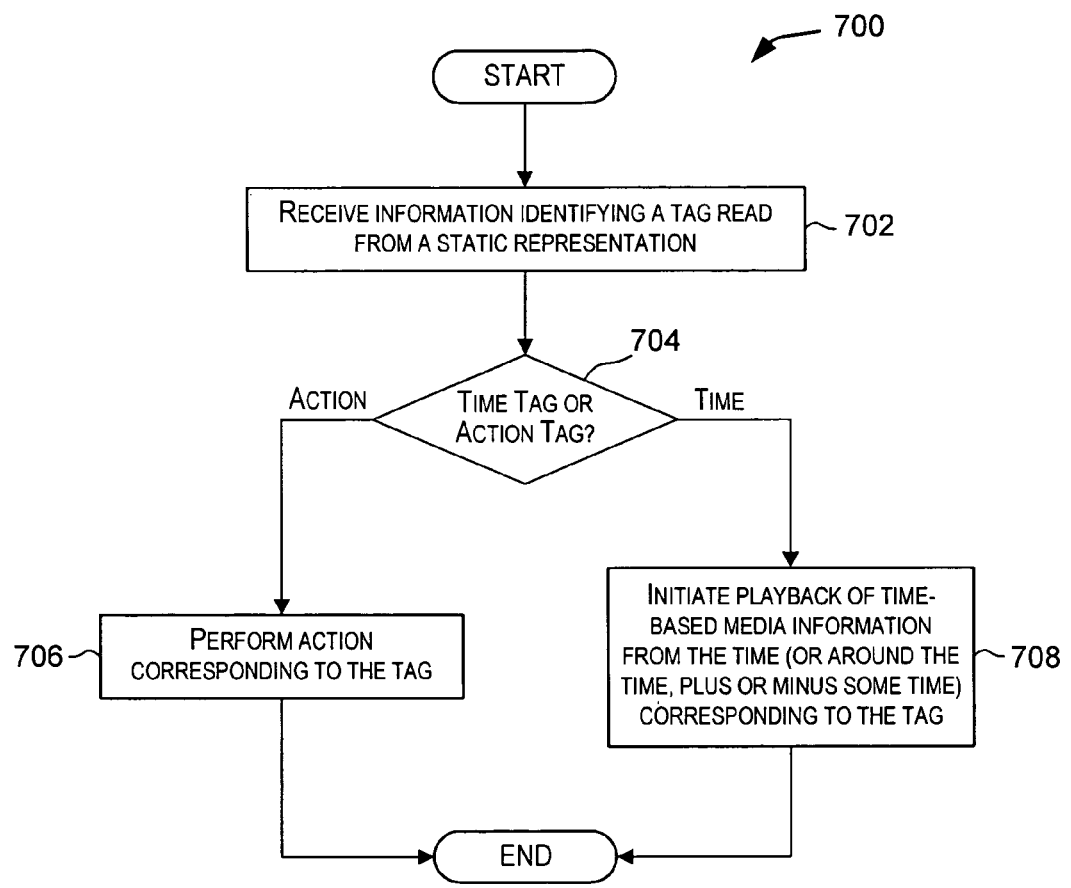
FIG. 7 is a simplified high-level flowchart depicting a method of processing tags according to an embodiment of the present invention.

FIG. 7 is a simplified high-level flowchart 700 depicting a method of processing tags according to an embodiment of the present invention. The method depicted in FIG. 7 may be performed by software code modules or instructions executed by a processor, hardware modules, or combinations thereof. Flowchart 700 depicted in FIG. 7 is merely illustrative of an embodiment of the present invention and is not intended to limit the scope of the present invention. Other variations, modifications, and alternatives are also within the scope of the present invention. The method depicted in FIG. 7 may be adapted to work with different implementation constraints.

Processing is initiated upon receiving information identifying a tag read from a static representation (step 702). A check is then made to see if the read tag is a time tag or an action tag (step 704). A time tag is a tag encoding a time, for example, tags associated with events and timelines. An action tag is a tag that encodes information identifying an action to be performed, for examples tags 230.

If it is determined in 704 that the tag is an action tag, then the action corresponding to the tag is initiated (step 706). If it is determined in 704 that the tag is a time tag, then playback of time-based media information from the time (or around the time, plus or minus some time) corresponding to the read tag is initiated (step 706).

For example, in FIG. 2, selecting a tag associated with a slides event invokes an application (e.g., a media player) that outputs the slides information for the selected slides event and also starts playback of the video (and audio or other information if available) information from the time corresponding to the selected tag (i.e., from a time when that event occurs in the time-based media information). The output device to be used for the playback is may be user-configurable. In one embodiment, a signal is sent from the tag reading device to a server that has access to the time-based media information. The server may then invoke an application (e.g., a media player) and start playback of the information on an output device. The server may also be configured to communicate a portion of the time-based media information to another device for output.

Figure 8:
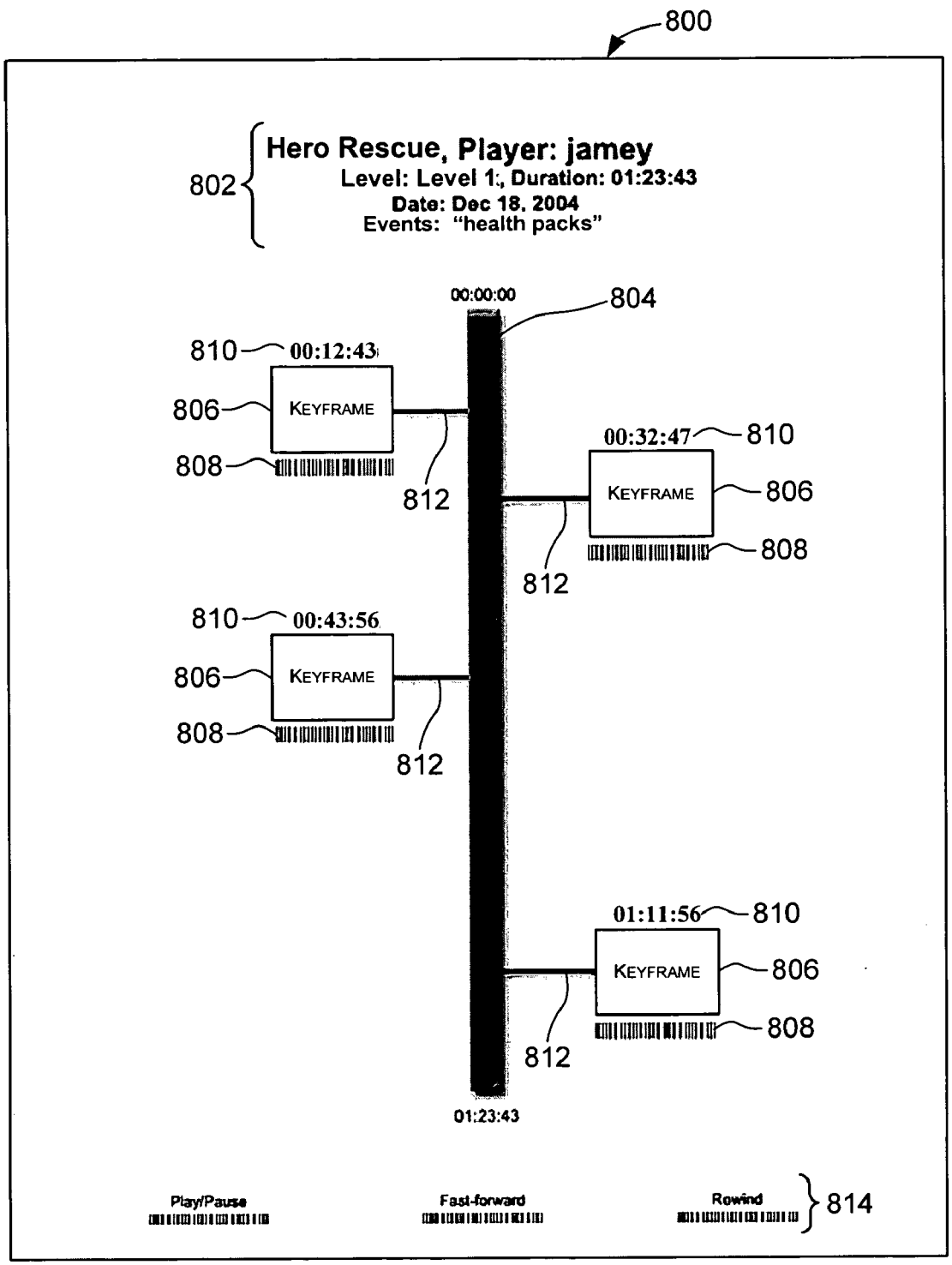
FIG. 8 depicts a simplified diagram of a static representation generated according to an embodiment of the present invention and printed on a paper page.

FIG. 8 depicts a simplified diagram of a static representation generated according to an embodiment of the present invention and printed on a paper page 800. The static representation depicted in FIG. 8 is generated for time-based media information recorded from the execution of a video game. In general, static representations may be generated for time-based media information generated by simulation programs such as games, simulators, etc. Page 800 depicted in FIG. 8 is merely illustrative of an embodiment of the present invention and is not intended to limit the scope of the present invention as recited in the claims. Other variations, modifications, and alternatives are also within the scope of the present invention.

Page 800 depicts a static representation generated for a video game "Hero Rescue". As shown in FIG. 8, information 802 related to the game is printed at the top of page 800. Information 802 includes the name of the game, information identifying a player of the game, the level of the game for which the static representation is generated, the duration of the time-based media information for which the static representation is generated, and the date on which the game was played. Information 802 also indicates the events (occurrences of "health packs") that are included in the static representation.

A timeline 804 (laid vertically) is printed on page 800. The top of timeline 804 represents the start time (00:00:00) of the game recording and the bottom of timeline 804 represents the end (01:23:43) of the time period for which the static representation is generated. Various events 806 are mapped to timeline 804. In FIG. 8, the events correspond to occurrences in the time-based media information when the user picked up health packs in the game. A visual representation is provided for each event. In FIG. 8, the visual representation for each event is a keyframe extracted from the recorded video portion of the time-based media information for the game when the event occurs. In alternative embodiments, multiple visual representations may be used to depict each event.

A tag 808 is printed for each event. Each tag 808 ("time tag") for an event represents or encodes a time during the game simulation when the event approximately occurred. In FIG. 8, barcodes are used to implement the tags. A time 810 corresponding to each tag associated with an event is also printed. For each event, a line or arrow 812 (correlation information) is printed showing the approximate location along timeline 804 when the event occurs in the recorded time-based media information for the game simulation. Time tag 808 enables access to the recorded time-based media information and may initiate replay of the time-based media information from a time corresponding to the scanned tag. A set of tags 814 is also printed for performing various actions such as controlling playback of the output information, fast forward the playback, perform rewind operations, etc.

As depicted in FIGS. 2, 3, and 8, various different formats may be used for representing a timeline in the static representation. Further, the time-based media information for which the static representation is generated may be provided from different sources. Various other styles and formats may also be used.

Figure 9:
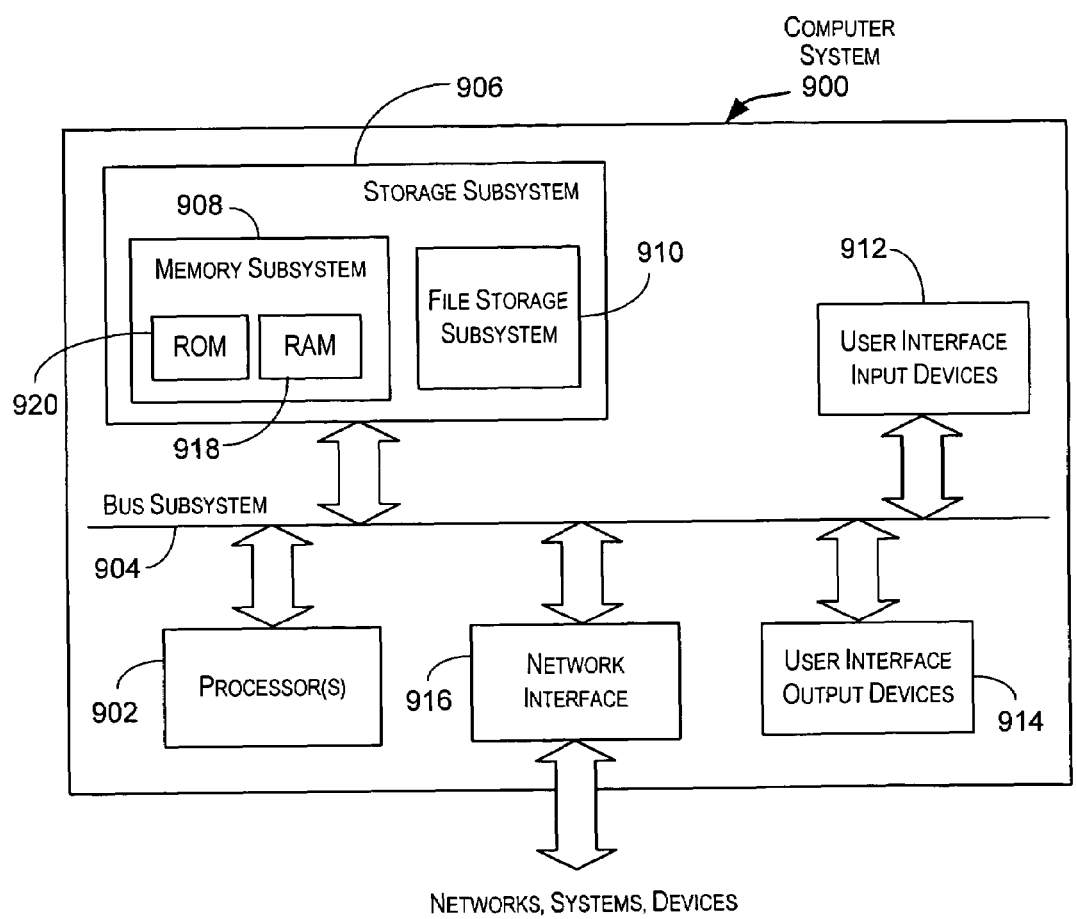
FIG. 9 is a simplified block diagram of a computer system that may be used to practice an embodiment of the present invention.

FIG. 9 is a simplified block diagram of a computer system 900 that may be used to practice an embodiment of the present invention. As shown in FIG. 9, computer system 900 includes a processor 902 that communicates with a number of peripheral devices via a bus subsystem 904. These peripheral devices may include a storage subsystem 906, comprising a memory subsystem 908 and a file storage subsystem 910, user interface input devices 912, user interface output devices 914, and a network interface subsystem 916.

Bus subsystem 904 provides a mechanism for letting the various components and subsystems of computer system 900 communicate with each other as intended. Although bus subsystem 904 is shown schematically as a single bus, alternative embodiments of the bus subsystem may utilize multiple busses.

Network interface subsystem 916 provides an interface to other computer systems, networks, and devices. Network interface subsystem 916 serves as an interface for receiving data from and transmitting data to other systems from computer system 900.

User interface input devices 912 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 900.

User interface output devices 914 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 900. The output devices may be used to playback time-based media information.

Storage subsystem 906 may be configured to store the basic programming and data constructs that provide the functionality of the present invention. Software (code modules or instructions) that provides the functionality of the present invention may be stored in storage subsystem 906. These software modules or instructions may be executed by processor(s) 902. Storage subsystem 906 may also provide a repository for storing data used in accordance with the present invention. Storage subsystem 906 may comprise memory subsystem 908 and file/disk storage subsystem 910.

Memory subsystem 908 may include a number of memories including a main random access memory (RAM) 918 for storage of instructions and data during program execution and a read only memory (ROM) 920 in which fixed instructions are stored. File storage subsystem 910 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 900 can be of various types including a personal computer, a portable computer, a workstation, a network computer, a mainframe, a kiosk, or any other data processing system. Due to the ever-changing nature of computers and networks, the description of computer system 900 depicted in FIG. 9 is intended only as a specific example for purposes of illustrating the preferred embodiment of the computer system. Many other configurations having more or fewer components than the system depicted in FIG. 9 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. The various techniques discussed in the applications identified in the "Cross-Reference to Related Applications" section may also be used to generate the static representation.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of generating static representations of time-based multimedia information, the method comprising:
receiving, at a data processing system, time-based multimedia information electronically stored in one or more multimedia files, the time-based multimedia information characterized by a start time and an end time;
receiving, at the data processing system, event criteria specifying one or more types of multimedia events that occur in multimedia information;
receiving, at the data processing system, textual information;
analyzing, by a processor of the data processor system, the time-based multimedia information in response to the textual information to identify using one or more content recognition techniques audio information or video information in the time-based multimedia information that includes the textual information;
determining, by the processor of the data processing system, a set of multimedia events occurring in the identified audio information or video information that satisfy the event criteria, each multimedia event in the set of multimedia events being of the specified one or more types of multimedia events and occurring as a multimedia event in the time-based multimedia information between a first time and a second time;
determining, by the processor of the data processing system, for each multimedia event in the set of multimedia events occurring in the time-based multimedia information between the first time and the second time, a time between the first time and the second time when the multimedia event occurs in the time-based multimedia information;
generating, by the processor of the data processing system, a static representation for the time-based multimedia information, wherein the static representation comprises:
a timeline having a start point corresponding to the first time and an end point corresponding to the second time;
an indication along the timeline, for each multimedia event in the set of multimedia events occurring in the time-based multimedia information between the first time and the second time, of the time between the first time and the second time when the multimedia event occurs in the time-based multimedia information;
a tag for each multimedia event in the set of multimedia events occurring in the time-based multimedia information between the first time and the second time, each tag for a multimedia event corresponding to the time determined between the first time and the second time for the multimedia event in the time-based multimedia information, wherein each tag is configured to be readable by a reading device associated with a computer system that enables access based on the tag to the time-based media information stored in the multimedia document substantially from the time corresponding to the tag; and
printing the static representation using the data processing device on a paper medium.

2. The method of claim 1 further comprising:
generating a visual representation for each multimedia event in the set of multimedia events being of the specified one or more types of multimedia events and occurring in the time-based multimedia information between the first time and the second time;
wherein the static representation for the time-based multimedia information comprises the visual representation for each multimedia event in the set of multimedia events; and
wherein the indication along the timeline, for each multimedia event in the set of multimedia events being of the specified one or more types of multimedia events and occurring in the time-based multimedia information between the first time and the second time, of the time between the first time and the second time when the multimedia event occurs in the time-based multimedia information comprises a mark on the timeline corresponding to the time determined for the multimedia event and information correlating the mark on the timeline to the visual representation generated for the multimedia event.

3. The method of claim 1 further comprising:
receiving information at the computer system from the reading device indicating selection of a first tag associated with the static representation printed on the paper medium;
determining, using the computer system, a first time corresponding to the first tag; and
initiating playback of a portion of the time-based multimedia information using the computer system from the first time.

4. A computer-implemented method of generating a representation of time-based media information, the method comprising:
receiving, at a data processing system, time-based multimedia information electronically stored in one or more multimedia files, the time-based multimedia information characterized by a start time and an end time;
receiving, at the data processing system, information indicative of one or more search terms;
analyzing, by a processor of the data processing system, the time-based multimedia information in response to the one or more search terms to identify using one or more content recognition techniques portions of content in the time-based multimedia information that include at least one of the one or more search terms;
determining, by the processor of the data processing system, a set of multimedia events occurring in the time-based multimedia information to be included in a static representation of the time-based multimedia information based on the portions of content in the time-based multimedia information that include at least one of the one or more search terms, the set of multimedia events comprising one or more multimedia events being of one or more types of multimedia events and occurring in the time-based media information between a first time and a second time;
determining, by the processor of the data processing system, for each multimedia event in the set of multimedia events occurring in the time-based multimedia information between the first time and the second time, a time between the first time and the second time when the multimedia event occurs in the time-based multimedia information;

generating, by the processor of the data processing system, a static representation for the time-based multimedia information, wherein the static representation comprises:
- a timeline having a start point corresponding to the first time and an end point corresponding to the second time, the timeline comprising a plurality of sections, each timeline section corresponding to a segment of time between the first time and the second time, each timeline section having an associated start time and an end time;
- an indication along the timeline, for each multimedia event in the set of multimedia events occurring in the time-based multimedia information between the first time and the second time, of the time between the first time and the second time when the multimedia event occurs in the time-based multimedia information;
- a tag for each multimedia event in the set of multimedia events occurring in the time-based multimedia information between the first time and the second time, each tag for a multimedia event corresponding to the time determined between the first time and the second time for the multimedia event, wherein each tag is configured to be readable by a reading device associated with a computer system that enables access based on the tag to the time-based multimedia information from the time corresponding to the tag; and printing the static representation using the data processing device on a paper medium.

5. The method of claim 4 wherein determining, by the processor of the data processing system, the set of multimedia events occurring in the time-based multimedia information to be included in a static representation of the time-based multimedia information based on the portions of content in the time-based multimedia information that include at least one of the one or more search terms comprises:
- determining, by the processor of the data processing system, a plurality of multimedia events occurring in the time-based multimedia information;
- determining, by the processor of the data processing system, for each timeline section, one or more multimedia events in the plurality of multimedia events that occur during the time segment corresponding to the timeline section; and
- selecting, by the processor of the data processing system, for each timeline section, at most a threshold number of multimedia events from the one or more multimedia events determined for the timeline section; and
- wherein the set of multimedia events identified by the data processing device to be included in the static representation comprises multimedia events selected by the data processing device for the plurality of timeline sections.

6. The method of claim 5 wherein selecting, by the processor of the data processing system, at most a threshold number of events for each timeline section comprises:
- determining, by the processor of the data processing device, whether the number of multimedia events in the one or more multimedia events determined to occur during the time segment corresponding to the timeline section exceeds the threshold number; and
- selecting, by the processor of the data processing device, upon determining that the number of multimedia events in the one or more multimedia events exceeds the threshold number, at most the threshold number of multimedia events from the one or more multimedia events that are determined to occur during the time segment corresponding to the timeline section.

7. A system for generating a representation of time-based media information, the system comprising:
- a processor; and
- a printer;
- wherein the processor is configured to:
  - receive time-based multimedia information electronically stored in one or more multimedia files, the time-based multimedia information characterized by a start time and an end time;
  - receive event criteria specifying one or more types of multimedia events that occur in multimedia information;
  - receive textual information;
  - analyze the time-based multimedia information in response to the textual information to identify using one or more content recognition techniques audio information or video information in the time-based multimedia information that includes the textual information;
  - determine a set of multimedia events occurring in the identified audio information or video information that satisfy the event criteria, each multimedia event in the set of multimedia events being of the specified one or more types of multimedia events and occurring in the time-based multimedia information between a first time and a second time;
  - determine, for each multimedia event in the set of multimedia events occurring in the time-based multimedia information between the first time and the second time, a time between the first time and the second time when the multimedia event occurs in the time-based multimedia information;
  - generate a static representation for the time-based multimedia information, wherein the static representation comprises:
    - a timeline having a start point corresponding to the first time and an end point corresponding to the second time;
    - an indication along the timeline, for each multimedia event in the set of multimedia events occurring in the time-based multimedia information between the first time and the second time, of the time between the first time and the second time when the multimedia event occurs in the time-based multimedia information;
    - a tag for each multimedia event in the set of multimedia events occurring in the time-based multimedia information between the first time and the second time, each tag for a multimedia event corresponding to the time determined between the first time and the second time for the multimedia event in the time-based multimedia information, wherein each tag is configured to be readable by a reading device associated with a computer system that enables access based on the tag to the time-based media information stored in the multimedia document substantially from the time corresponding to the tag; and
- wherein the printer is configured to print the static representation on a paper medium.

8. The system of claim 7 wherein:
- the processor is further configured to generate a visual representation for each multimedia event in the set of multimedia events being of the specified one or more types of multimedia events and occurring in the time-based multimedia information between the first time and the second time;

the static representation for the time-based multimedia information comprises the visual representation for each multimedia event in the set of multimedia events; and the indication along the timeline, for each multimedia event in the set of multimedia events being of the specified one or more types of multimedia events and occurring in the time-based multimedia information between the first time and the second time, of the time between the first time and the second time of when the multimedia event occurred comprises a mark on the timeline corresponding to the time determined for the multimedia event and information correlating the mark on the timeline to the visual representation generated for the event.

9. The system of claim 7 wherein the processor is configured to:

receive information from the reading device indicating selection of a first tag associated with the static representation printed on the paper medium;

determine a first time corresponding to the first tag; and initiate playback of a portion of the time-based multimedia information from the first time.

10. A system for generating a representation of time-based media information, the system comprising:

a processor; and a printer;

wherein the processor is configured to:

receive time-based multimedia information electronically stored in one or more multimedia files, the time-based multimedia information characterized by a start time and an end time;

receive information indicative of one or more search terms;

analyze the time-based multimedia information in response to the one or more search terms to identify using one or more content recognition techniques portions of content in the time-based multimedia information that include at least one of the one or more search terms;

determine a set of multimedia events occurring in the time-based multimedia information to be included in a static representation of the time-based multimedia information, the set of multimedia events comprising one or more multimedia events being of one or more types of multimedia events and occurring in the time-based media information between a first time and a second time;

determine, for each multimedia event in the set of multimedia events occurring in the time-based multimedia information between the first time and the second time, a time between the first time and the second time when the multimedia event occurs in the time-based multimedia information;

generate a static representation for the time-based multimedia information, wherein the static representation comprises:

a timeline having a start point corresponding to the first time and an end point corresponding to the second time, the timeline comprising a plurality of sections, each timeline section corresponding to a segment of time between the first time and the second time, each timeline section having an associated start time and an end time;

an indication along the timeline, for each multimedia event in the set of multimedia events occurring in the time-based multimedia information between the first time and the second time, of the time between the first time and the second time when the multimedia event occurs in the time-based multimedia information;

a tag for each multimedia event in the set of multimedia events occurring in the time-based multimedia information between the first time and the second time, each tag for a multimedia event corresponding to the time determined between the first time and the second time for the multimedia event, wherein each tag is configured to be readable by a reading device associated with a computer system that enables access based on the tag to the time-based multimedia information from the time corresponding to the tag; and wherein the printer is configured to print the static representation on a paper medium.

11. The system of claim 10 wherein:

the processor is configured to determine the set of multimedia events by:

determining a plurality of multimedia events occurring in the time-based multimedia information;

determining, for each timeline section, one or more multimedia events from the plurality of multimedia events that occur during the time segment corresponding to the timeline section; and selecting, for each timeline section, at most a threshold number of multimedia events from the one or more events determined for the timeline section; and the set of multimedia events determined to be included in the static representation comprises multimedia events selected for the plurality of timeline sections.

12. The system of claim 11 wherein the processor is configured to select at most a threshold number of multimedia events for each timeline section by:

determining whether the number of multimedia events in the one or more multimedia events determined to occur during the time segment corresponding to the timeline section exceeds the threshold number; and selecting, upon determining that the number of multimedia events in the one or more multimedia events exceeds the threshold number, at most the threshold number of multimedia events from the one or more multimedia events that are determined to occur during the time segment corresponding to the timeline section.

13. A computer-readable storage medium storing a plurality of instructions for controlling a data processor to generate a representation of time-based media information, the computer-readable storage medium comprising:

instructions that cause the data processor to receive time-based multimedia information electronically stored in one or more multimedia files, the time-based multimedia information characterized by a start time and an end time;

instructions that cause the data processor to receive event criteria specifying one or more types of multimedia events that occur in multimedia information;

instructions that cause the data processor to receive textual information;

instructions that cause the data processor to analyze the time-based multimedia information in response to the textual information to identify using one or more content recognition techniques audio information or video information in the time-based multimedia information that includes the textual information;

instructions that cause the data processor to determine a set of multimedia events occurring in the identified audio information or video information that satisfy the event criteria, each multimedia event in the set of multimedia events being of the specified one or more types of multimedia events and occurring in the time-based multimedia information between a first time and a second time;

instructions that cause the data processor to determine, for each multimedia event in the set of multimedia events occurring in the time-based multimedia information between the first time and the second time, a time between the first time and the second time when the multimedia event occurs in the time-based multimedia information;

instructions that cause the data processor to generate a static representation for the time-based multimedia information, wherein the static representation comprises:

a timeline having a start point corresponding to the first time and an end point corresponding to the second time;

an indication along the timeline, for each multimedia event in the set of multimedia events occurring in the time-based multimedia information between the first time and the second time, of the time between the first time and the second time when the multimedia event occurs in the time-based multimedia information;

a tag for each multimedia event in the set of multimedia events occurring in the time-based multimedia information between the first time and the second time, each tag for a multimedia event corresponding to the time determined between the first time and the second time for the multimedia event in the time-based multimedia information, wherein each tag is configured to be readable by a reading device associated with a computer system that enables access based on the tag to the time-based media information stored in the multimedia document substantially from the time corresponding to the tag; and instructions that cause the data processor to initiate printing of the static representation on a paper medium.

14. A computer-readable storage medium storing a plurality of instructions for controlling a data processor to generate a representation of time-based media information, the computer-readable storage medium comprising:

instructions that cause the data processor to receive time-based multimedia information electronically stored in one or more multimedia files, the time-based multimedia information characterized by a start time and an end time;

instructions that cause the data processor to receive information indicative of one or more search terms;

instructions that cause the data processor to analyze the time-based multimedia information in response to the one or more search terms to identify using one or more content recognition techniques portions of content in the time-based multimedia information that include at least one of the one or more search terms;

instructions that cause the data processor to determine a set of multimedia events occurring in the time-based multimedia information to be included in a static representation of the time-based multimedia information based on the portions of content in the time-based multimedia information that include at least one of the one or more search terms, the set of multimedia events comprising one or more multimedia events being of one or more types of multimedia events and occurring in the time-based media information between a first time and a second time;

instructions that cause the data processor to determine, for each multimedia event in the set of multimedia events occurring in the time-based multimedia information between the first time and the second time, a time between the first time and the second time when the multimedia event occurs in the time-based multimedia information;

instructions that cause the data processor to generate a static representation for the time-based multimedia information, wherein the static representation comprises:

a timeline having a start point corresponding to the first time and an end point corresponding to the second time, the timeline comprising a plurality of sections, each timeline section corresponding to a segment of time between the first time and the second time, each timeline section having an associated start time and an end time;

an indication along the timeline, for each multimedia event in the set of multimedia events occurring in the time-based multimedia information between the first time and the second time, of the time between the first time and the second time when the multimedia event occurs in the time-based multimedia information;

a tag for each multimedia event in the set of multimedia events occurring in the time-based multimedia information between the first time and the second time, each tag for a multimedia event corresponding to the time determined between the first time and the second time for the multimedia event, wherein each tag is configured to be readable by a reading device associated with a computer system that enables access based on the tag to the time-based multimedia information from the time corresponding to the tag; and instructions that cause the data processor to initiate printing of the static representation on a paper medium.

15. The computer-readable storage medium of claim 14 wherein:

the instructions that cause the data processor to determine the set of multimedia events comprise:

instructions that cause the data processor to determine a plurality of multimedia events occurring in the time-based multimedia information;

instructions that cause the data processor to determine, for each timeline section, one or more multimedia events in the plurality of multimedia events that occur during the time segment corresponding to the timeline section; and instructions that cause the data processor to select, for each timeline section, at most a threshold number of multimedia events from the one or more multimedia events determined for the timeline section; and the set of multimedia events determined to be included in the static representation comprises multimedia events selected for the plurality of timeline sections.

16. The computer-readable storage medium of claim 15 wherein the instructions that cause the data processor to select at most a threshold number of multimedia events for each timeline section comprise:

instructions that cause the data processor to determine whether the number of multimedia events in the one or more multimedia events determined to occur during the time segment corresponding to the timeline section exceeds the threshold number; and instructions that cause the data processor to select, upon determining that the number of multimedia events in the one or more multimedia events exceeds the threshold number, at most the threshold number of multimedia events from the one or more multimedia events that are determined to occur during the time segment corresponding to the timeline section.

* * * * *